US008929635B2

(12) United States Patent
Chen et al.

(10) Patent No.: US 8,929,635 B2
(45) Date of Patent: *Jan. 6, 2015

(54) METHOD AND SYSTEM FOR TOOTH SEGMENTATION IN DENTAL IMAGES

(75) Inventors: Shoupu Chen, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 13/467,401

(22) Filed: May 9, 2012

(65) Prior Publication Data
US 2013/0022255 A1 Jan. 24, 2013

Related U.S. Application Data

(63) Continuation-in-part of application No. 13/187,596, filed on Jul. 21, 2011, now Pat. No. 8,761,493.

(51) Int. Cl.
*G06K 9/00* (2006.01)
*G06K 9/34* (2006.01)
*G06K 9/80* (2006.01)
*G06T 7/00* (2006.01)
*A61B 5/00* (2006.01)

(52) U.S. Cl.
CPC .............. *G06T 7/0083* (2013.01); *G06K 9/34* (2013.01); *G06T 7/0089* (2013.01); *G06T 2200/24* (2013.01); *G06T 2207/10081* (2013.01); *G06T 2207/20096* (2013.01); *G06T 2207/20116* (2013.01); *G06T 2207/30036* (2013.01)
USPC ............ 382/131; 382/128; 382/173; 433/229

(58) Field of Classification Search
CPC ..... G06K 9/3233; G06K 9/3241; G06K 9/34; A61B 5/0088; G06T 7/0012; G06T 7/0079; G06T 7/0081; G06T 2207/20092; G06T 2207/20096; G06T 2207/20101; G06T 2207/20141; G06T 2207/10081
USPC ........................... 382/131, 128, 173; 433/229
See application file for complete search history.

(56) References Cited

U.S. PATENT DOCUMENTS 5,431,562 A 7/1995 Andreiko et al.
6,210,162 B1 4/2001 Chishti et al.
(Continued)

FOREIGN PATENT DOCUMENTS

WO WO 2008/092009 7/2008

OTHER PUBLICATIONS

Sinop, et al. "A Seeded Image Segmentation Framework Unifying Graph Cuts and Random Walker which Yields a New Algorithm." ICCV 2007. (2007): 1-8. Print.*

(Continued)

*Primary Examiner* — Michael A Newman

(57) ABSTRACT

A method for segmenting a feature of interest from a volume image acquires image data elements from the image of a subject. One or more boundary points along a boundary of the feature of interest are identified according to one or more geometric primitives with reference to the displayed view. A foreground seed curve is defined according to the one or more identified boundary points. A background field array that lies outside of, and is spaced from, the foreground seed curve by a predetermined distance, is defined. Segmentation is applied to the volume image according to foreground values obtained according to image data elements that are spatially bounded on or within the foreground seed curve and according to background field array values to create a segmented feature of interest.

10 Claims, 38 Drawing Sheets

(56) References Cited

U.S. PATENT DOCUMENTS

| | | | |
|---|---|---|---|
| 6,409,504 | B1 | 6/2002 | Jones et al. |
| 7,317,819 | B2 | 1/2008 | Janes |
| 7,324,661 | B2 | 1/2008 | Kemp et al. |
| 7,460,709 | B2 | 12/2008 | Grady |
| 8,244,017 | B2 | 8/2012 | Chun et al. |
| 8,253,778 | B2 | 8/2012 | Atsushi |
| 8,594,428 | B2 * | 11/2013 | Aharoni et al. .......... 382/180 |
| 8,605,973 | B2 * | 12/2013 | Wang et al. ............. 382/128 |
| 8,761,493 | B2 * | 6/2014 | Chen et al. .............. 382/131 |
| 2003/0039389 | A1 | 2/2003 | Jones et al. |
| 2004/0175671 | A1 | 9/2004 | Jones et al. |
| 2004/0227750 | A1 | 11/2004 | Su et al. |
| 2006/0029275 | A1 * | 2/2006 | Li et al. ................ 382/173 |
| 2006/0147872 | A1 | 7/2006 | Andreiko |
| 2006/0227131 | A1 | 10/2006 | Schiwietz et al. |
| 2007/0127801 | A1 | 6/2007 | Kalke |
| 2008/0118143 | A1 | 5/2008 | Gordon et al. |
| 2008/0136820 | A1 * | 6/2008 | Yang et al. .............. 345/440 |
| 2008/0232539 | A1 | 9/2008 | Pasini et al. |
| 2008/0310716 | A1 * | 12/2008 | Jolly et al. .............. 382/173 |
| 2009/0003672 | A1 * | 1/2009 | Maier et al. ............. 382/128 |
| 2009/0097727 | A1 | 4/2009 | Jolly et al. |
| 2010/0278299 | A1 | 11/2010 | Loustauneau et al. |
| 2011/0137626 | A1 | 6/2011 | Matov et al. |
| 2012/0313941 | A1 | 12/2012 | Li et al. |

OTHER PUBLICATIONS

International Search Report mailed Jan. 30, 2013 for International Application No. PCT/US2012/047268, 3 pages.

Krsek et al., "Teeth and jaw 3D reconstruction in stomatology", *Proceedings of the International Conference on Medical Information Visualisation—BioMedical Visualisation*, 6 pages, 2007.

Shah et al. "Automatic tooth segmentation using active contour without edges", 2006, IEEE Biometrics Symposium, 6 pages.

Akhoondali et al., "Rapid Automatic Segmentation and Visualization of Teeth in CT-Scan Data", *Journal of Applied Sciences*, pp. 2031-2044, 2009.

Gao et al., "Automatic Tooth Region Separation for Dental CT Images", *Proceedings of the 2008 Third International Conference on Convergence and Hybrid Information Technology*, pp. 897-901, (2008).

M Sadeghi, G. Tien, G. Hamameh, M.S. Atkins, "Hands-free Interactive Image Segmentation Using Eyegaze", SPIE Medical Imaging 2009, vol. 7260, pp. 72601H1-72601H10.

Marie-Pierre Jolly, Leo Grady, "3D general lesion segmentation in CT", ISBI 2008, pp. 796-799.

Vladimir Vezhnevets, and Vadim Konouchine, "GrowCut—Interactive Multi-Label N-D Image Segmentation by Cellular Automata,", *Int'l. Conf. Computer Graphics and Vision 2005*, 7 pages.

R.L. Graham, "An Efficient Algorithm for Determining the Convex Hull Of A Finite Planar Set", Jan. 28, 1972, Information Processing Letters 1 (1972) pp. 132-133, North-Holland Publishing Company.

Hong Chen, et al., "Tooth Contour Extraction for Matching Dental Radiographs," Pattern Recognition, 2004 ICPR 2004 Proceedings of the 17th International Conference, 4 pages.

T.K. Schleyer, et al., "A Preliminary Analysis of the Dental Informatics Literature," Adv Dent Res, 17, pp. 20-24, Dec. 2003.

S.Y.Lee, et al., "Development of a Digital Panoramic X-ray Imaging System for Dental Applications," 2007 IEEE Nuclear Science Symposium Conference Record, vol. 4, pp. 2987-2990.

International Search Report mailed Oct. 30, 2012 for International Patent Application No. PCT/US2012/047265, 11 pages.

* cited by examiner

METHOD AND SYSTEM FOR TOOTH SEGMENTATION IN DENTAL IMAGES

CROSS REFERENCE TO RELATED APPLICATIONS

This is a Continuation-in-Part of commonly assigned U.S. application Ser. No. 13/187,596 filed on Jul. 21, 2011 now U.S. Pat. No. 8,761,493 entitled "METHOD AND SYSTEM FOR TOOTH SEGMENTATION IN DENTAL IMAGES" to Chen et al., incorporated herein in its entirety.

FIELD OF THE INVENTION

The present invention relates generally to image processing in x-ray computed tomography and, in particular, to digital CBCT (Cone Beam Computed Tomography) volume three dimensional teeth segmentation.

BACKGROUND

Imaging and image processing for computer-aided diagnosis and improved patient care are areas of interest to dental practitioners. Among areas of particular interest for computer-aided diagnosis, treatment assessment, and surgery is image segmentation, particularly for tooth regions.

Various approaches have been proposed to address tooth segmentation. For example, Shah et al. in a study entitled "Automatic tooth segmentation using active contour without edges", 2006, *IEEE Biometrics Symposium*, describes a method for automating postmortem identification of teeth for deceased individuals based on dental characteristics.

In "Teeth and jaw 3D reconstruction in stomatology", *Proceedings of the International Conference on Medical Information Visualisation—BioMedical Visualisation*, pp 23-28, 2007, researchers Krsek et al. describe a method dealing with problems of 3D tissue reconstruction in stomatology. In this process, 3D geometry models of teeth and jaw bones were created based on input CT image data.

Akhoondali et al. proposed a fast automatic method for the segmentation and visualization of teeth in multi-slice CT-scan data of the patient's head in an article entitled "Rapid Automatic Segmentation and Visualization of Teeth in CT-Scan Data", *Journal of Applied Sciences*, pp 2031-2044, 2009. The algorithm uses a sequence of processing steps. The mandible and maxilla are separated using maximum intensity projection in the y direction and a step like region separation algorithm. The dental region is separated using maximum intensity projection in the z direction, thresholding and cropping. The teeth are segmented using a region growing algorithm. The results are visualized using iso-surface extraction and surface and volume rendering.

In "Automatic Tooth Region Separation for Dental CT Images", *Proceedings of the 2008 Third International Conference on Convergence and Hybrid Information Technology*, pp 897-901, (2008), researchers Gao et al. disclose a method to construct and visualize the individual tooth model from CT image sequences for dental diagnosis and treatment.

Achieving error-free segmentation processing continues to be a challenge. Over-segmentation, with detection of false positives, continues to be a problem and can be troublesome in dental imaging, particularly where teeth are within very close proximity of each other. There is a desire to correctly differentiate foreground from background areas in a volume image.

SUMMARY OF THE INVENTION

It is an object of the present invention to advance the art of tooth segmentation from cone beam and other types of volume CT images. With this object in mind, the present invention provides a method for segmenting a feature of interest from a volume image, the method executed at least in part on a computer, comprising: acquiring image data elements from the volume image of a subject; displaying at least one view of the acquired volume; identifying one or more boundary points along a boundary of the feature of interest according to one or more geometric primitives defined by a user with reference to the displayed at least one view; forming a foreground seed curve defined according to the one or more identified boundary points; forming a background field array that lies outside of, and is spaced apart from, the foreground seed curve by a predetermined distance; applying segmentation to the volume image according to foreground values obtained according to image data elements that are spatially bounded on or within the foreground seed curve and according to background field array values; and displaying an image of the segmented feature of interest.

One or more of the embodiments of the present invention, in a synergistic manner, integrate skills of a human operator of the system with computer capabilities for user assisted teeth segmentation that also includes unfolding the volume image of the dental arch to provide panoramic images from the computed tomography image input. This approach takes advantage of human skills of creativity, use of heuristics, flexibility, and judgment, and combines these with computer advantages, such as speed of computation, capability for exhaustive and accurate processing, and reporting and data access capabilities.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION

Figure 1:
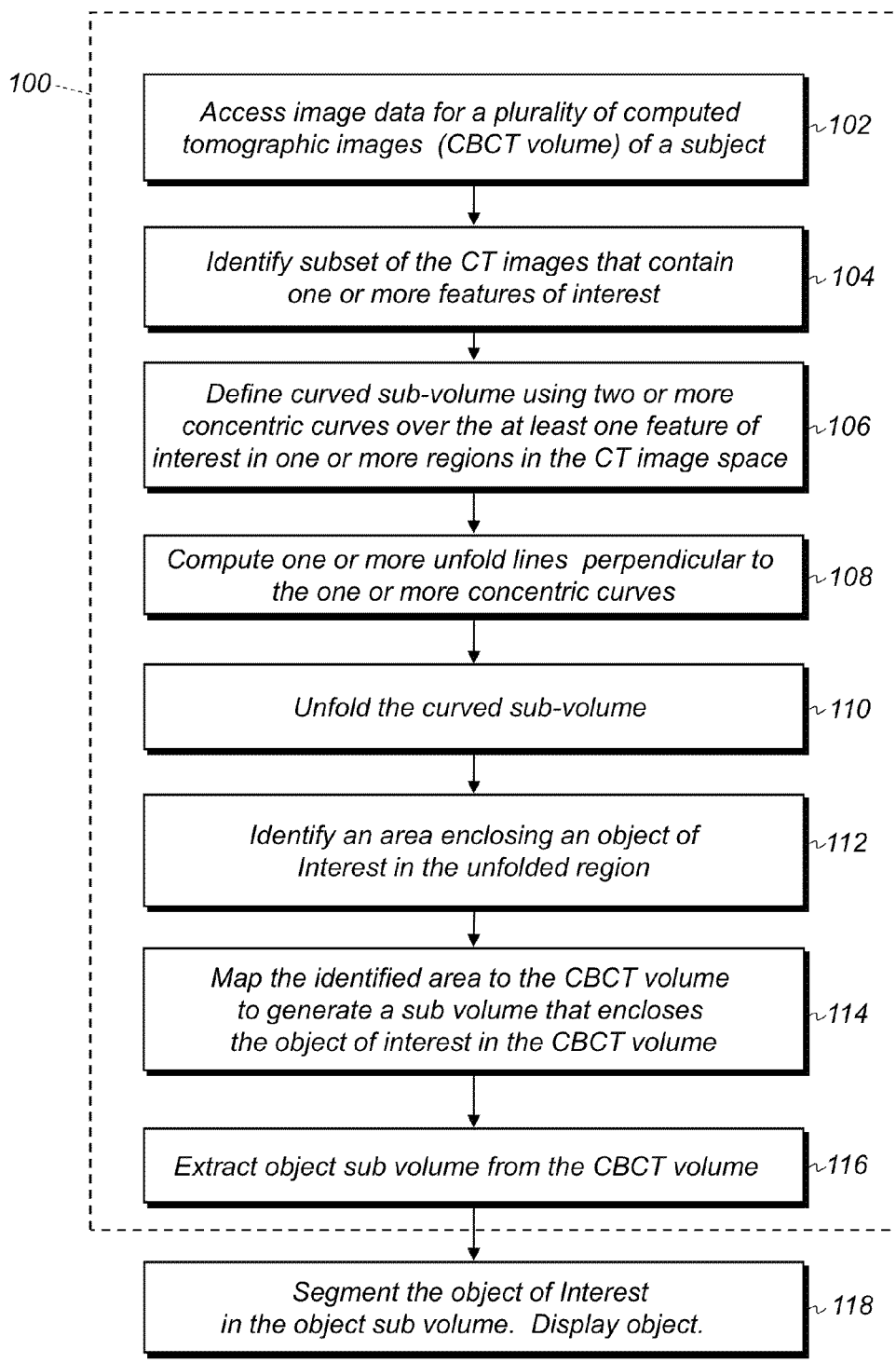
FIG. 1 is a logic flow diagram showing processes of the present invention in one embodiment.

In the following detailed description of embodiments of the present invention, reference is made to the drawings in which the same reference numerals are assigned to identical elements in successive figures. It should be noted that these figures are provided to illustrate overall functions and relationships according to embodiments of the present invention and are not provided with intent to represent actual size or scale.

The present application is a Continuation-in-Part of commonly assigned copending U.S. application Ser. No. 13/187,596 filed on Jul. 21, 2011 entitled "METHOD AND SYSTEM FOR TOOTH SEGMENTATION IN DENTAL IMAGES" to Chen et al., incorporated herein in its entirety.

In the context of the present invention, the descriptive terms "object of interest" or "feature of interest" generally indicate an object such as a tooth or other object in the mouth.

The term "set", as used herein, refers to a non-empty set, as the concept of a collection of elements or members of a set is widely understood in elementary mathematics. The term "subset", unless otherwise explicitly stated, is generally used herein to refer to a non-empty proper subset, that is, to a subset of the larger set, having one or more members. For a set S, a subset may comprise the complete set S. A "proper subset" of set S, however, is strictly contained in set S and excludes at least one member of set S.

For the description of the Graphical User Interface (GUI) that follows, the terms "user", "viewer", and "operator" can be considered synonymous. In the description that follows, the term "image data element" refers to a pixel (2D) or a voxel (3D) according to context. A "geometric primitive" has its standard meaning, referring to a two-dimensional shape or form that may be open or closed and can include, for example, a freeform or scribbled shape as well as a triangle, rectangle or other polygon, curve or set of curves or arcs, circle, ellipse, rounded form, or the like.

The subject matter of the present invention relates to digital image processing and computer vision technologies, which is understood to mean technologies that digitally process data from a digital image to recognize and thereby assign useful meaning to human-understandable objects, attributes, or conditions, and then to utilize the results obtained in further processing of the digital image.

Referring to the logic flow diagram of FIG. 1, there is shown a sequence of steps used for tooth segmentation for a dental Cone Beam Computed Tomography (CBCT) volume in one embodiment. A sequence of steps is grouped as an object sub-volume extraction step 100, shown in dashed outline, followed by a segmentation step 118. As part of this sequence, the CBCT volume, also termed a CT volume herein, is acquired in an image data acquisition step 102. A computed tomography (CT) volume contains image data elements for one or more images (or equivalently, slices). As each image slice is obtained, image data elements are 2-D pixel elements. For the reconstructed volume image, image data elements are 3-D voxel elements. An original reconstructed CT volume is formed using standard reconstruction algorithms known in the art, using multiple projections or sinograms obtained from a CT scanner. Normally, only a fraction or subset of the images that form the volume contain teeth or other high density features of interest and is selected for processing; the rest of the CT reconstructed volume accurately represents soft tissue or air.

Continuing with the sequence of FIG. 1, this identification of a subset of images for this procedure is done in an image selection step 104. A number of neighboring high density objects or other features of interest in an image (or slice) forms a first region. Similarly, a number of neighboring high density objects or other features of interest in another image (or slice) forms another region.

Figure 2:
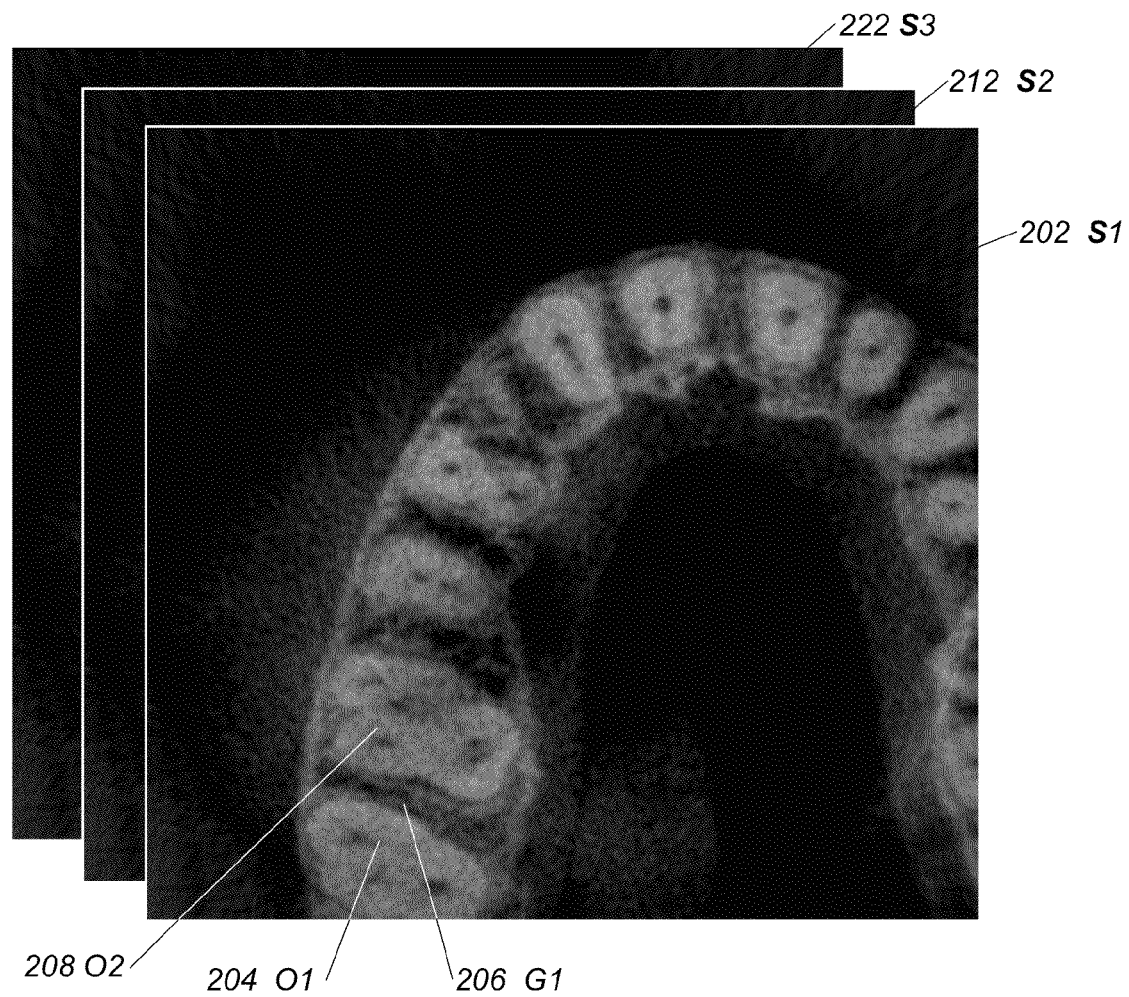
FIG. 2 is a view of a set of reconstructed CBCT images having features of interest.

FIG. 2 shows an exemplary dental CBCT volume that contains three slices (S1 202, S2 212, and S3 222) considered from a top view with respect to the teeth. Examples of high density objects are teeth O1 204 and O2 208 shown in slice S1 202. Here, objects O1 204 and O2 208 are parts of two neighboring teeth. All of these high density objects including O1 and O2 in slice S1 constitute a region in slice S1. Similarly, high density objects like O1 and O2 in slice S2 constitute a region in slice S2. The same applies to slice S3.

Figure 3A:
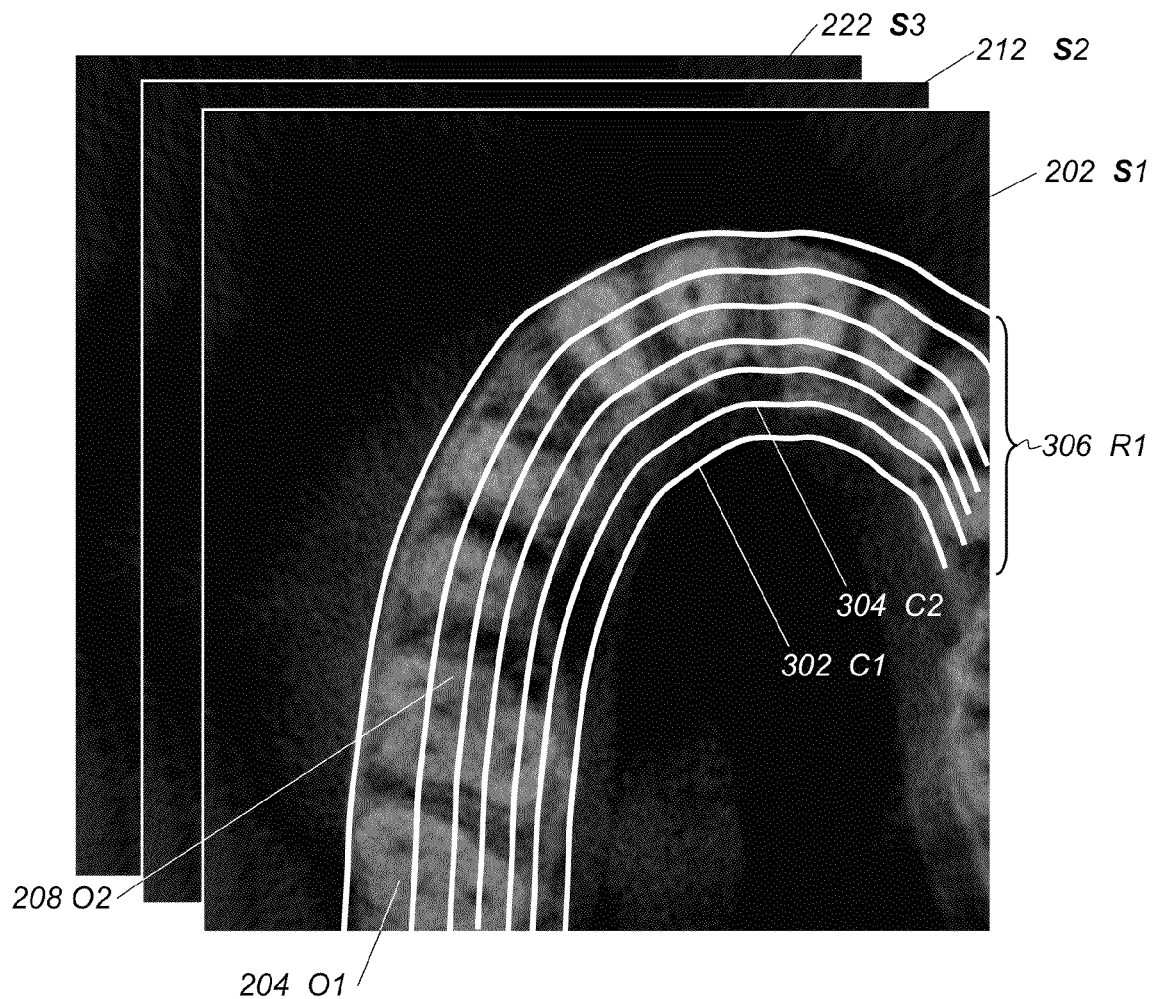
FIG. 3A is a view of a set of reconstructed CBCT images having features of interest with concentric curves overlaid.

As is shown in slice S1, the features of interest include high density objects (teeth in this case) collectively are arranged along a geometrically curved arcuate or arch shape. This shape can be traced by defining a set of substantially concentric curves as shown in FIG. 3A. These substantially concentric curves serve as a type of mathematical foliation or topological decomposition, with the corresponding volume decomposed into a set of two-dimensional subspaces. In this case, as shown in FIG. 3A, the subspaces roughly model the basic form of the dental arch. In a similar way, the standard decomposition of a volume into a set of slices can be considered to be a type of foliation; although this foliation does not share a number of the same properties of the foliation of the current invention. One property of the current foliation shown in FIG. 3A and applied in this processing is that there is a diffeomorphism between a plane and each leaf of the foliation. In the case of dental applications, the leaves of the respective foliations intersect a standard slice of a CT volume along a curve. Moreover, a family of leaves of this foliation appear as a series of concentric curves, as suggested in FIG. 3A.

Exemplary concentric curves including curve C1 302 and curve C2 304 are shown in slice S1 202. When forming a set of concentric curves in this way, the curves should cover (enclose) or define the features of interest, here, the region that is constituted of high density objects, teeth in this case. An exemplary region R1 306 is shown in slice S1. Similarly, although not visible in the arrangement of slices in FIG. 3A, another exemplary region is similarly formed in slice S2, or slice S3 and other image slices S4, S5, . . . Sk taken from this perspective.

First and second curved paths are considered substantially concentric wherein the curved paths can be said to have the same basic shape, at different scale, and wherein the distance between the first and second curved paths at any point varies by no more than about 20% from the average distance value between them. For generally arcuate paths, two arcs are considered substantially concentric when their centers are spaced apart from each other by no more than about 30% of the radius of the larger arc.

Therefore, referring back to the sequence of FIG. 1, in a curved sub-volume definition step 106, the curvature of the dental arch is detected and used as a feature to form a curved or curved arch sub-volume for assisting in tooth segmentation. In this step, one or more substantially concentric curves are formed, traced, or otherwise identified over the at least feature of interest. As shown schematically in FIG. 3B, by stacking the regions that are defined along these concentric curves, that is, stacking of region R1 306 from slice S1 in FIG. 3A and corresponding regions R2, R3, . . . Rk from slices S2, S3, . . . Sk that would be defined in the same way, a curved slab can be formed as an curved sub-volume 130, containing one or more of the features of interest, here, regions of one or more high density objects cropped from the larger image volume.

Figure 3B:
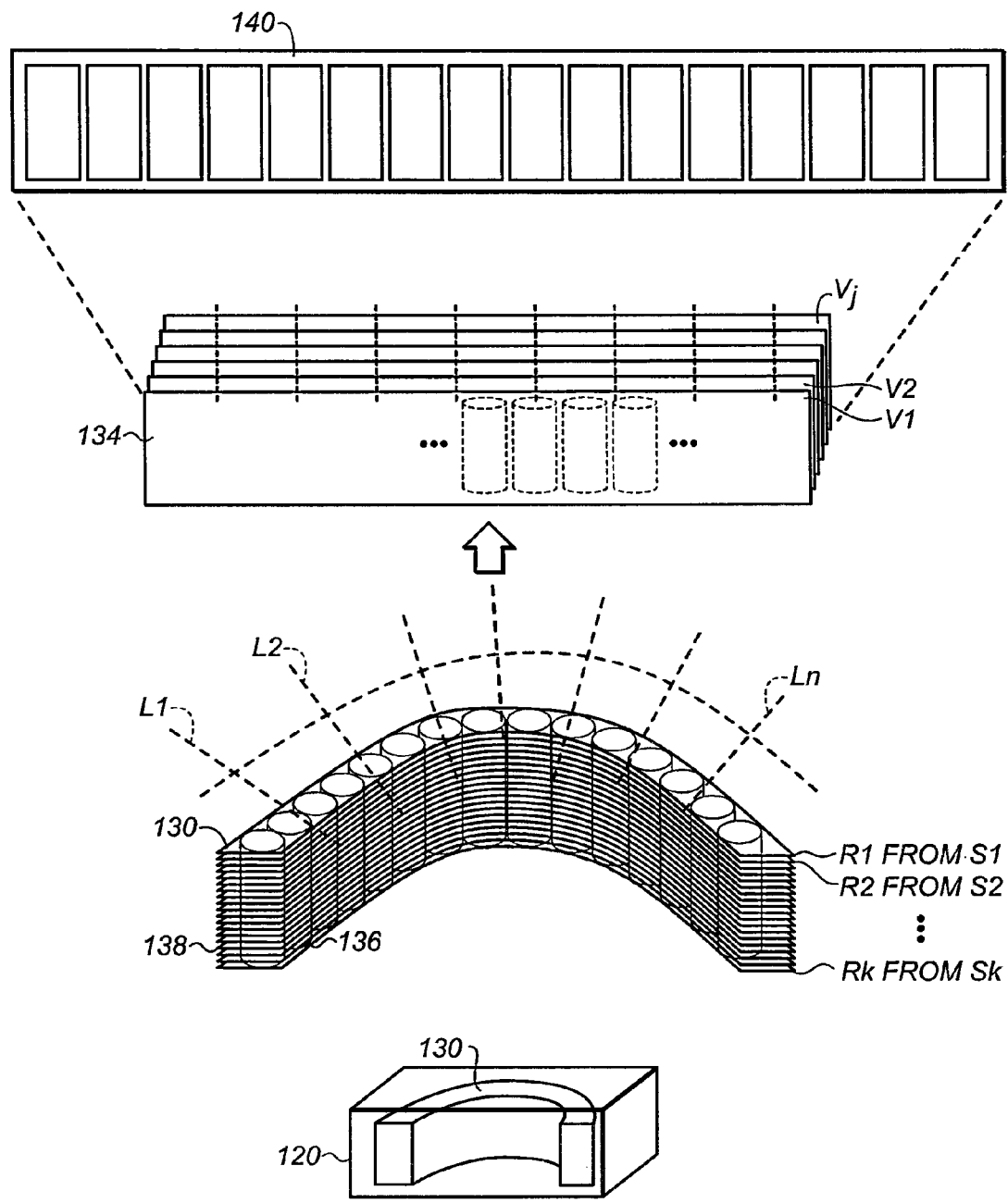
FIG. 3B is a schematic diagram that shows how a panoramic image is formed by unfolding a curved sub-volume.

The diagram of FIG. 3B shows schematically how the segmentation sequence of the present invention proceeds to generate one or more panoramic views 140 from a dental CT volume 120. A first set of operations, through step 106 in FIG. 1, generate the curved slab of curved sub-volume 130, from the original CT volume 120. An unfold line computing step 108 then provides a utility that will be used subsequently for unfolding the curved sub-volume 130 along a selected curve to generate the desired flattened or unfolded panoramic view 140. In its effect, this maps the leaf of the foliation back to a plane, which can be readily manipulated and viewed as an image. As the sequence shown in FIG. 3B indicates, the curved sub-volume 130 is formed by stacking slices aligned generally along a first direction. Unfolding then operates in a planar direction that is orthogonal to this first direction, as shown in the view of an unfolded slab, termed an unfolded sub-volume 134. For unfolding, image data elements that lie along or nearby each fold line are re-aligned according to a realignment of the fold lines. This realignment generally aligns the fold lines from their generally radial arrangement to a substantially parallel orientation. Image data elements that were initially aligned with the fold lines in the original, generally radial arrangement follow the fold line re-orientation, effectively "flattening" the curved sub-volume with little or no distortion of the tooth and its position relative to other teeth.

Unfolded sub-volume 134 can be visualized as a stacked series of vertical slice images V1, V2, . . . Vj, as shown. Each vertical slice provides a panoramic image obtained at some depth within unfolded sub-volume 134. Subsequent steps then present the unfolded views to the user as a type of index to the volume that is to be segmented. That is, selection from the unfolded view enables the user to provide hint (or seed) information that is used for the subsequent segmentation of the tooth or other object.

The one or more concentric curves or curved paths in FIG. 3A could be traced using an automated approach or a semi-automatic approach. In an automated approach, slice S1 can be processed through a sequence of steps that include noise filtering, smoothing, intensity thresholding, binary morphological filtering, medial curve estimation, and pruning to identify a first curve that fits or approximates the arch shape of the teeth region. Subsequent concentric curves can then be defined using the shape and position of the first estimated curve as a starting point. These steps described are exemplary steps that are well known for those skilled in the art; other manual and automated processing steps could alternately be performed for providing a structure to support unfolding.

For a semi-automatic approach, which can be simple and robust by comparison with automated processing, user entries initialize a few nodes along an imaginary medial curve along the arch shape region in slice S1, for example. These few nodes then become the starting points for a curve fitting algorithm, such as a spline fitting algorithm, for example, to form a first curve that fits or approximates the arch shape of the teeth region. Subsequent concentric curves for defining the curved sub-volume can then be developed using the first estimated curve. Those skilled in the art will recognize that these steps are exemplary and that suitable results for identifying the curved sub-volume of the dental arch could be obtained in a number of alternate ways.

Figure 4:
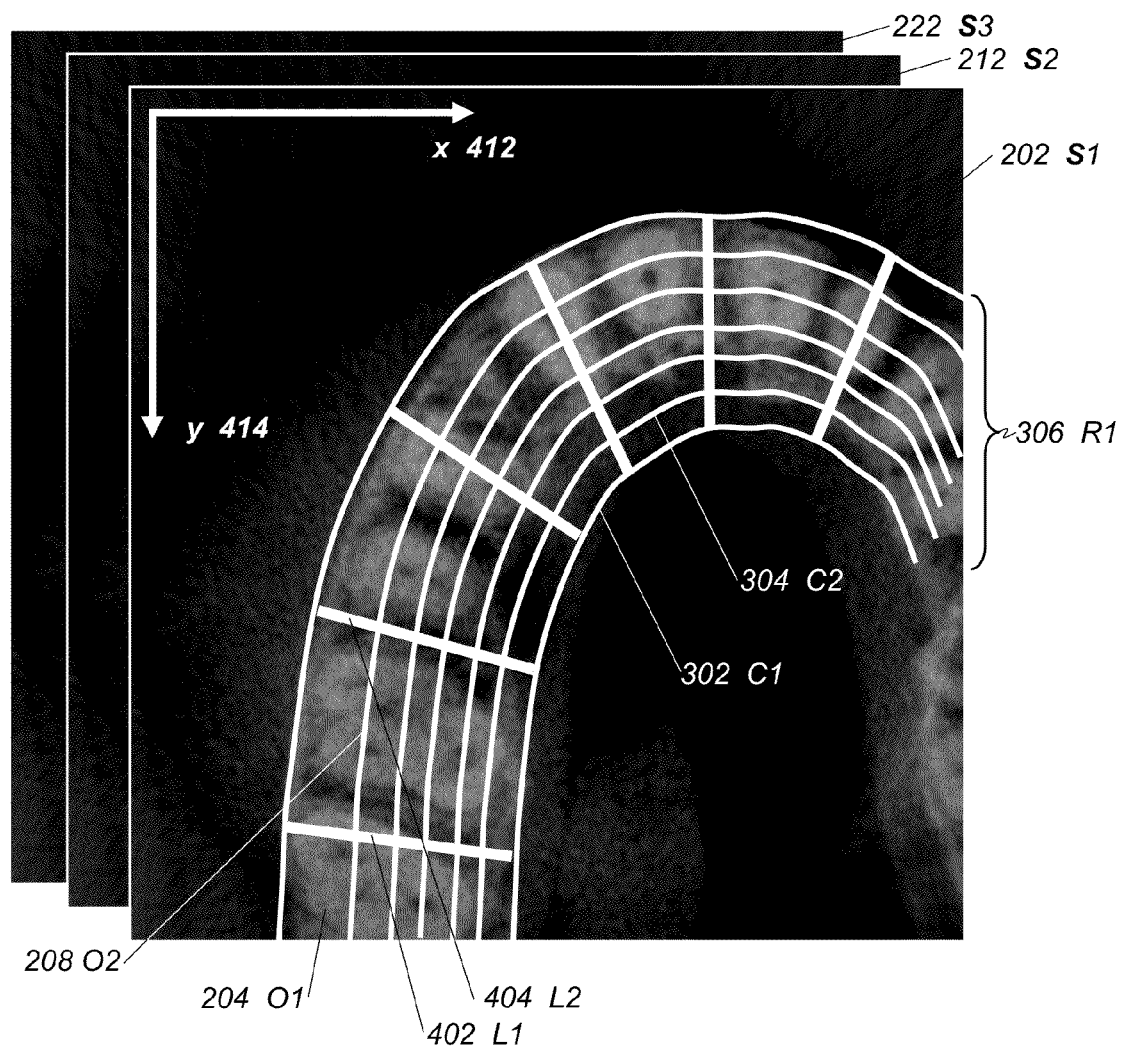
FIG. 4 is a view of a set of reconstructed CBCT images having objects of interest with concentric curves and lines perpendicular to the concentric curves overlaid.

Forming curved sub-volume 130 helps to reduce the amount of data that is processed for segmentation of the tooth or other object, but the arch or curved sub-volume itself is difficult to work with for identification of an object in segmentation processing. As noted previously, after defining curved sub-volume 130 using one or more concentric curves, the next step in FIG. 1 is an unfold line computing step 108. In this step, a series of unfold lines L1, L2, . . . Ln are defined for facilitating the unfold operation. In one embodiment of the present invention, unfold lines L1, L2, . . . Ln are generated using the same set of concentric curves that were used to define curved sub-volume 130. Each unfold line is substantially perpendicular, to within +/−8 degrees, at its intersection to concentric curves in the tomographic image space of curved sub-volume 130. Exemplary perpendicular unfold lines are shown as lines L1 402 and L2 404 in FIG. 4. In practice, best resolution and results for unfolding are typically provided using multiple unfold lines that are closely spaced apart. FIGS. 3B and 4 show only a few representative unfold lines for better visibility and description. Unfold lines are projected generally radially outward across curved sub-volume 130, so that each unfold line extends at least from an inside curved surface 136 to an outside curved surface 138 as shown in FIG. 3B. In extending across curved sub-volume 130, each unfold line intersects a number of image data elements, voxels (in 3-D representation) or pixels (in 2-D representation), that will subsequently be re-aligned in the unfolding operation that follows.

It is noted that two neighboring perpendicular unfold lines could touch or intersect at one end, within curved sub-volume 130, but be spaced further apart at the other end, such as by examining the exemplary perpendicular unfold lines shown in slice S1 in FIG. 4. It can also be noted that perpendicularity of the unfold lines to one or more curves can be advantageous, providing a configuration that allows a symmetric unfolding operation. A list of the unfold lines generated is saved for use in remapping in a subsequent step.

Alternatively, a medial curve, that is, a curve substantially centered within the arch shape region in slice S1, is itself sufficient for use in defining a plurality of unfold lines, such as lines L1 402 and L2 404 in FIG. 4, with each unfold line perpendicular to the medial curve of the arch-shaped region in S1.

Unfolding Sequence

A further step in the segmentation processing sequence of FIG. 1 "unfolds" the curved sub-volume obtained in step 106, realigning voxels (pixels) using the perpendicular unfold lines L1, L2, ... Ln computed in step 108. In an unfolding step 110, the curved slab of the curved sub-volume 130, containing one or more of the regions of one or more high density objects, is unfolded with the help of the computed unfold lines L1, L2, ... Ln perpendicular to the concentric curves.

In the unfolding operation, points along the perpendicular unfold lines are used as reference points for identifying how the image data from the curved sub-volume 130 is to be aligned in the unfolded view. One sequence of operations for unfolding the curved sub-volume is as follows:

(i) Define an x-y coordinate system for slice S1 as shown by an x direction 412 and y direction 414 in FIG. 4, with an origin at the upper left corner of slice S1 202 or other suitable location. Suppose there are a total of M concentric curves (C1, C2, ... Cm, ... CM), and total of N perpendicular lines (L1, L2, ... Ln, ... LN).

(ii) Denote an x position matrix of size M×N by X. Denote a y position matrix of size M×N by Y.

(iii) Store the x position of an intersection point of Cm and Ln at matrix position $X(m,n)$. The y position of the intersection point of Cm and Ln is stored at $Y(m,n)$.

(iv) Denote an arbitrary slice by S with the same x-y (x 412 and y 414) coordinate system defined in FIG. 4.

(v) Denote an arbitrary intensity image by U of size of M×N.

Define:
$U(m,n)=S(Y(m,n), X(m,n))$.
Therefore, for a specific slice:

$$U1(m,n)=S1(Y(m,n),X(m,n)),$$

$$U2(m,n)=S2(Y(m,n),X(m,n)),$$

$$U3(m,n)=S3(Y(m,n),X(m,n)),$$

$$UK(m,n)=SK(Y(m,n),X(m,n)),$$

wherein K is the number of slices that constitute the CBCT volume, in the direction of slices Sk, where k=1 ... K, contained in the unfolded curved slab of the curved sub-volume 130, as was shown in FIG. 3B. Collectively, the intensity images U1, U2, U3, and UK formed and stacked in this way constitute an unfolded sub-volume 134.

Figure 5:
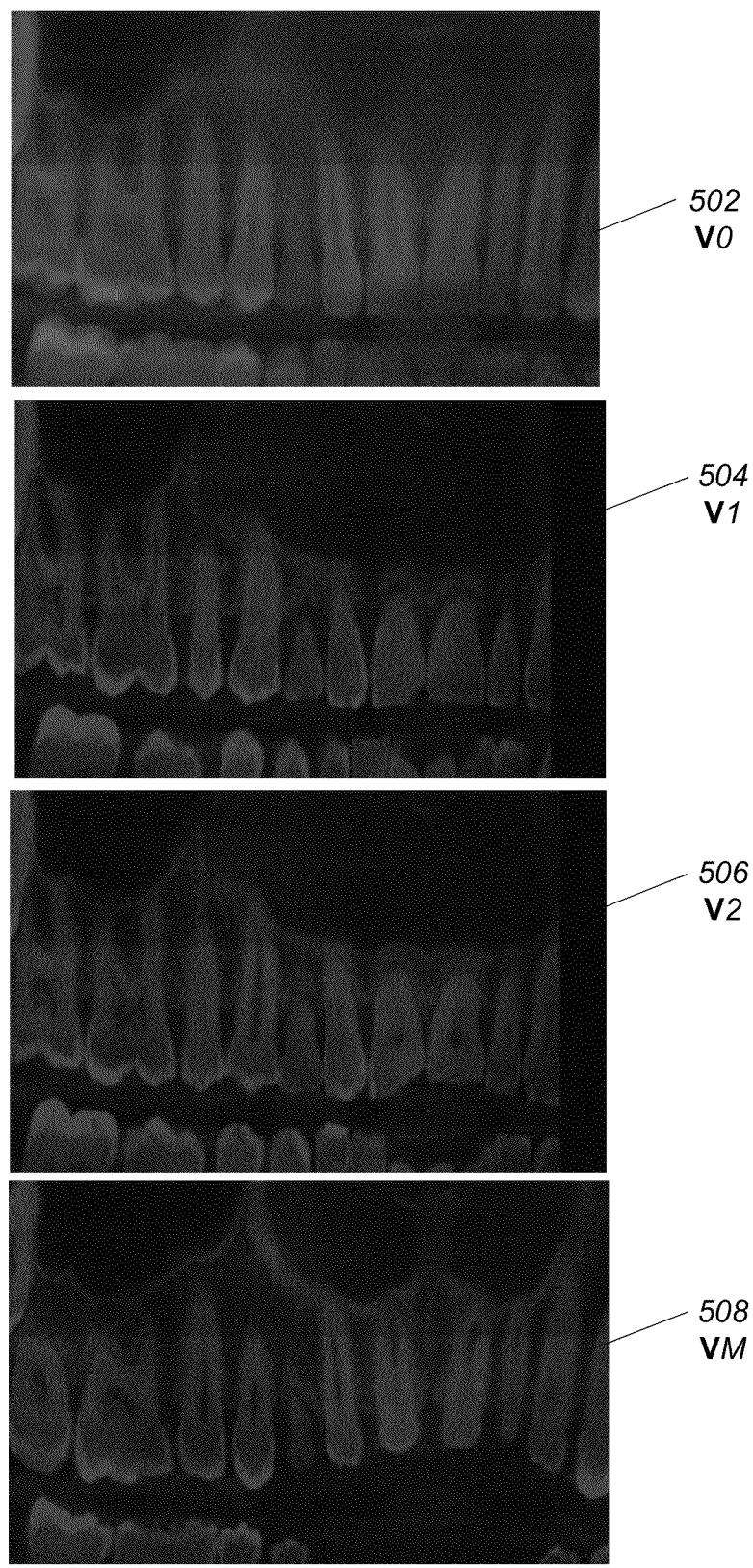
FIG. 5 shows a plurality of panoramic images of an unfolded curved slab that is formed by the regions covered by the concentric curves.

The same unfolded sub-volume 134 can be represented as a stack of images, in an orthogonal direction, of the original stacked plane. That is, the curved sub-volume 130 in FIG. 3B could alternately be considered as shown in unfolded sub-volume 134 and in FIG. 5, as a stack of vertical slice images V1, V2, ... VM. Each of these VM stacked images has a dimension of K×N. Images V1 (504), V2 (506) ... VM (508) in FIG. 5 are referred to as panoramic images.

Embodiments of the present invention not only provide the unfolding method for obtaining individual panoramic images as vertical slice images Vm, but also combine the individual images to form a composite vertical slice image V0, formed by averaging, summing, or otherwise combining the individual vertical slice images V1, V2, ... VM, that can be useful for improved segmentation processing.

In one embodiment, composite vertical slice image V0 is formed as an average, using:

$$V0=(V1+V2+ \ldots +VM)/M.$$

By way of example, an actual computed example of image V0 (502) is shown in FIG. 5.

In another embodiment, any vertical slice image Vm, m=1 ... M, could be a composite vertical slice image, formed using $V_m=f(\{V_{m1}, \ldots V_{mn}\})$, where $f$ is an operation that could be a moving average, median average, or other suitable linear or nonlinear operation; wherein $\{V_{m1}, \ldots V_{mn}\} \subseteq \{V_1, \ldots V_M\}$.

Identifying an Object Sub-Volume

Once unfolded sub-volume 134 has been generated, operator interaction assists an automated process in order to define an object sub-volume that includes a single tooth or other object to be segmented.

It can be observed from the unfolded panoramic views of FIG. 5 that the high density objects (teeth) in the different images V1, V2, ... VM are aligned approximately along a straight line (all visible in the same image, e.g. V0) instead of along a curved axis as in the original slices shown in FIG. 2. Referring back to the sequence of FIG. 1, an area identification step 112 identifies an area enclosing an object of interest in the unfolded region. This provides information that is employed for identifying an object sub-volume. Step 112 can be executed in a straightforward manner with a computer or other processor by displaying the planar, unfolded image (for example, displaying composite image V0), and obtaining, from operator instructions, spatially and geometrically meaningful information regarding the object of interest.

Figure 6A:
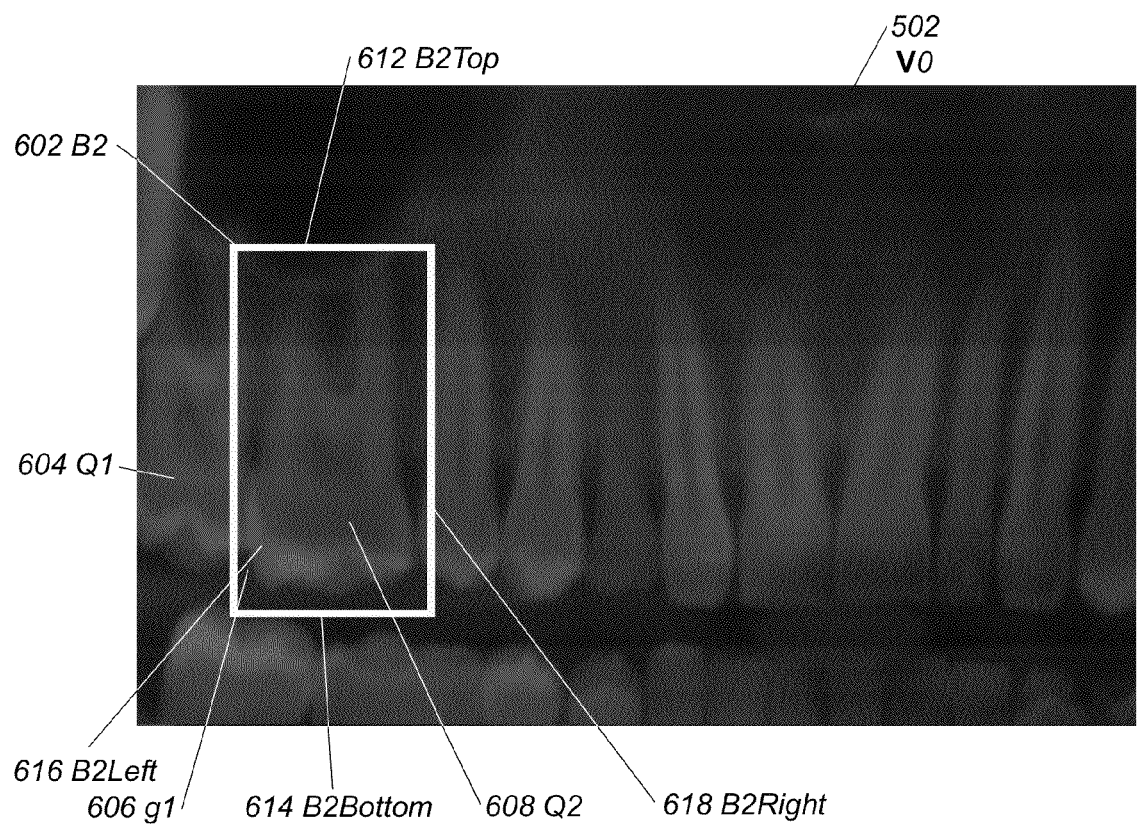
FIG. 6A is a view of a panoramic image with a bounding box that indicates the area of an object of interest.

In at least one embodiment, the operator provides information that outlines a particular tooth from the composite image, using a pointing device such as a computer input device, mouse, or other pointer or on a touch screen display, for example. In one embodiment, the operator defines a bounding box surrounding the tooth or other object; however, other outlining and selection shapes or inputs could alternately be used for this purpose. By way of example, FIG. 6A shows a bounding box B2 (602) enclosing a tooth Q2 (608) displayed in image V0 (502). Note that tooth Q2 corresponds to object O2 (208) in FIG. 2. Accordingly, neighboring object O1 (204) in FIG. 2 becomes tooth Q1 (604).

Although there are advantages in providing bounding box or other outline information in composite image V0, this location definition can also be entered using any of the other panoramic images of vertical slices V1, V2, . . . VM of FIG. 5. As shown in the sequence of FIG. 1, this bounding box B2 is used in a mapping step 114 for mapping the identified area to the CBCT volume to generate a sub-volume that encloses the object of interest (that is, O2) in the CBCT volume constituted by slices S1, S2, S3 . . . etc. in FIG. 2. The top edge position of the bounding box B2 in FIG. 6A is denoted by B2Top (612), the bottom edge position by B2Bottom (614), the left edge position by B2Left (616), and the right edge position by B2Right (618). The gap G1 (206) in FIG. 2 is denoted by g1 (606) in FIG. 6A.

Figure 6B:
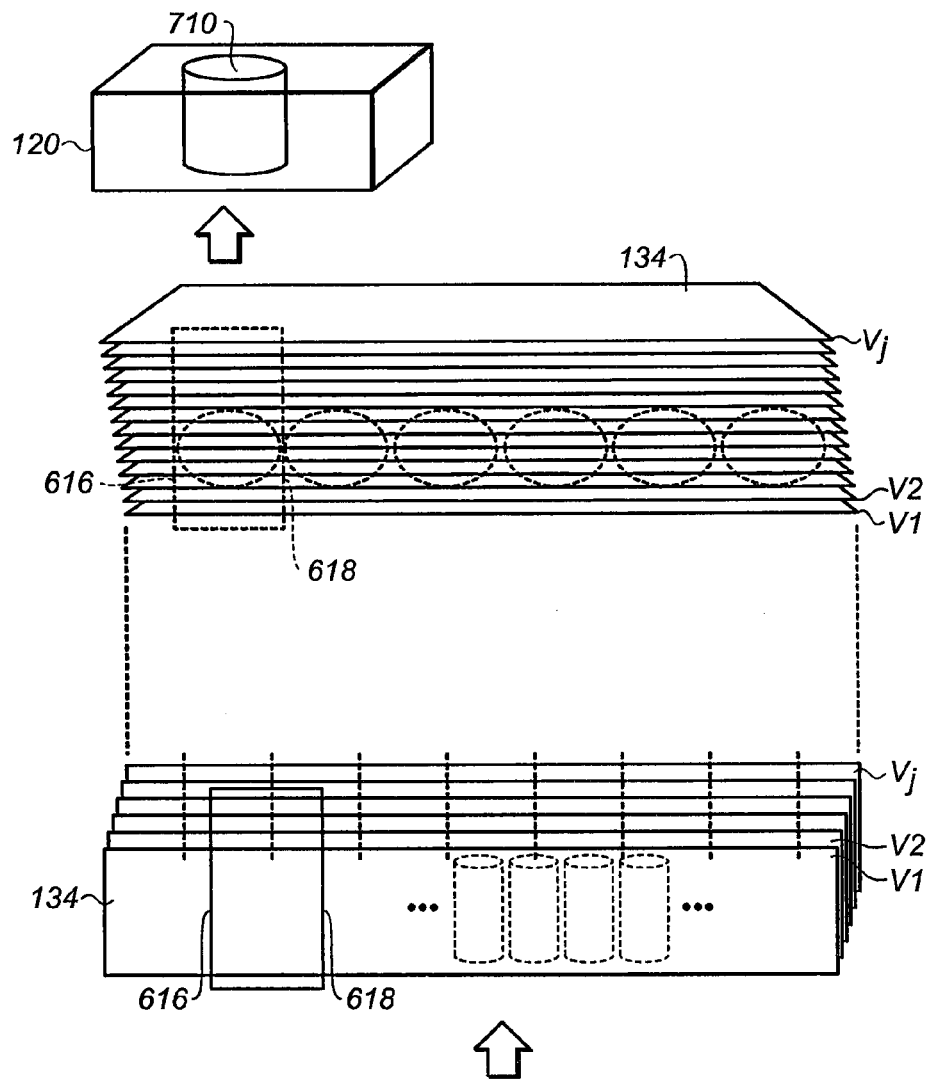
FIG. 6B is a schematic diagram that shows the use of a bounding box for identifying an object sub-volume from a composite panoramic image.
Figure 6B:
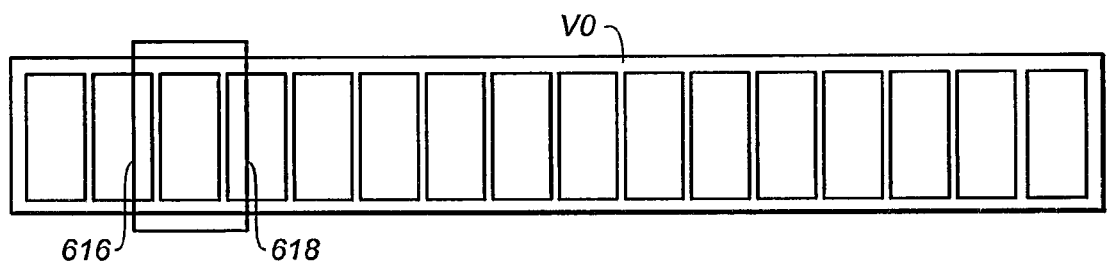
Figure 7:
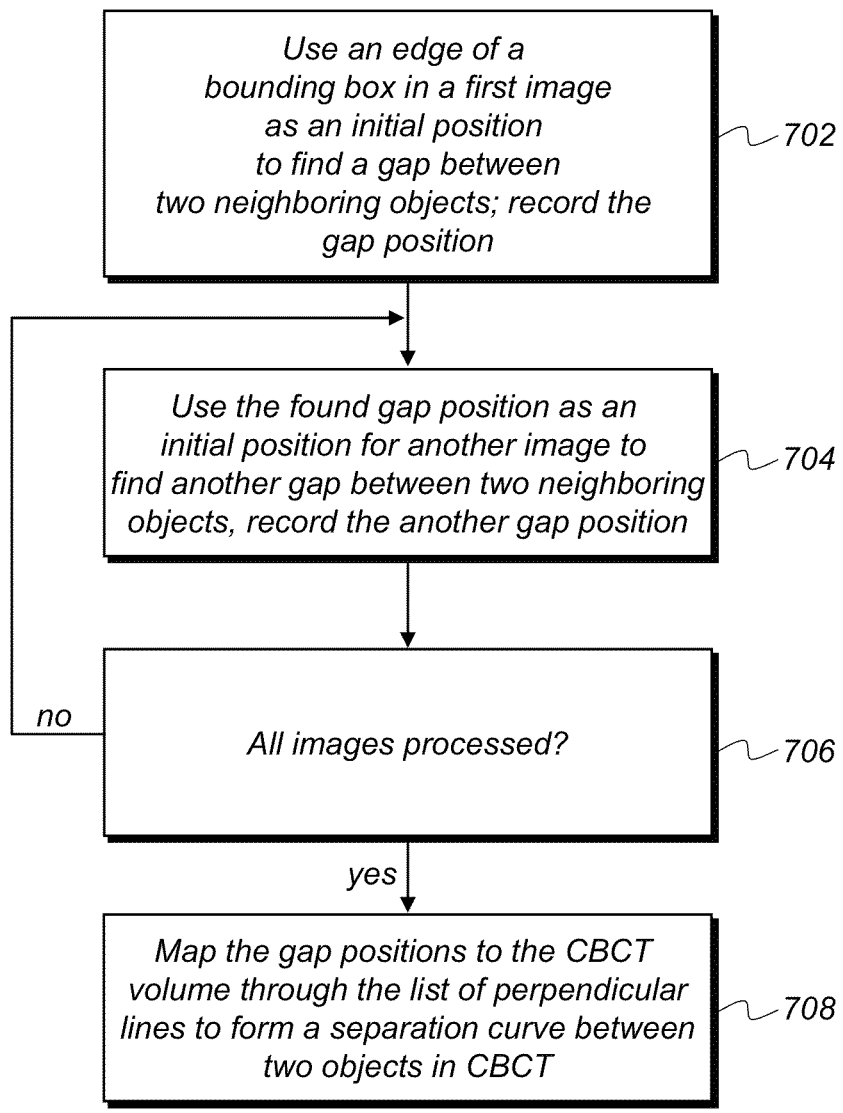
FIG. 7 is a flowchart showing processes of mapping area of an object of interest to CBCT images.

The schematic diagram of FIG. 6B shows, from top and side views, how bounding box edges are used to help define an object sub-volume 710 that encloses an object. Bounding box edges help to define starting points for algorithmic techniques that detect gaps indicating edges between teeth. For this purpose, mapping step 114 of the FIG. 1 sequence begins using the left and right edge positions to find gaps between neighboring teeth or other objects. FIG. 7 depicts the work flow of such an operation, consistent with an embodiment of the present invention. In a gap detection step 702, an edge (e.g. B2Left in FIG. 6A) is used as an initial position in a first panoramic image (e.g. V1) to find a gap position between two neighboring objects (e.g. Q1 and Q2). The gap position is recorded. This initial gap position is then used as a starting point in a subsequent gap detection step 704 that detects another gap position between two objects in the next panoramic image (e.g. V2). The newly found gap position is similarly recorded. This process of searching for gaps between neighboring objects in panoramic images repeats, working successively through each vertical slice image Vn in unfolded sub-volume 134. A decision step 706 determines whether or not all vertical slice images are processed.

In a mapping step 708, the recorded gap positions are mapped back to the CBCT volume space to form a first separation curve between two objects in the CBCT volume, defining the border between the two teeth or other objects. The perpendicular lines (L1, L2, . . . Ln, . . . LN) that were obtained as described with reference to FIG. 4 are used in the mapping process.

Figure 8:
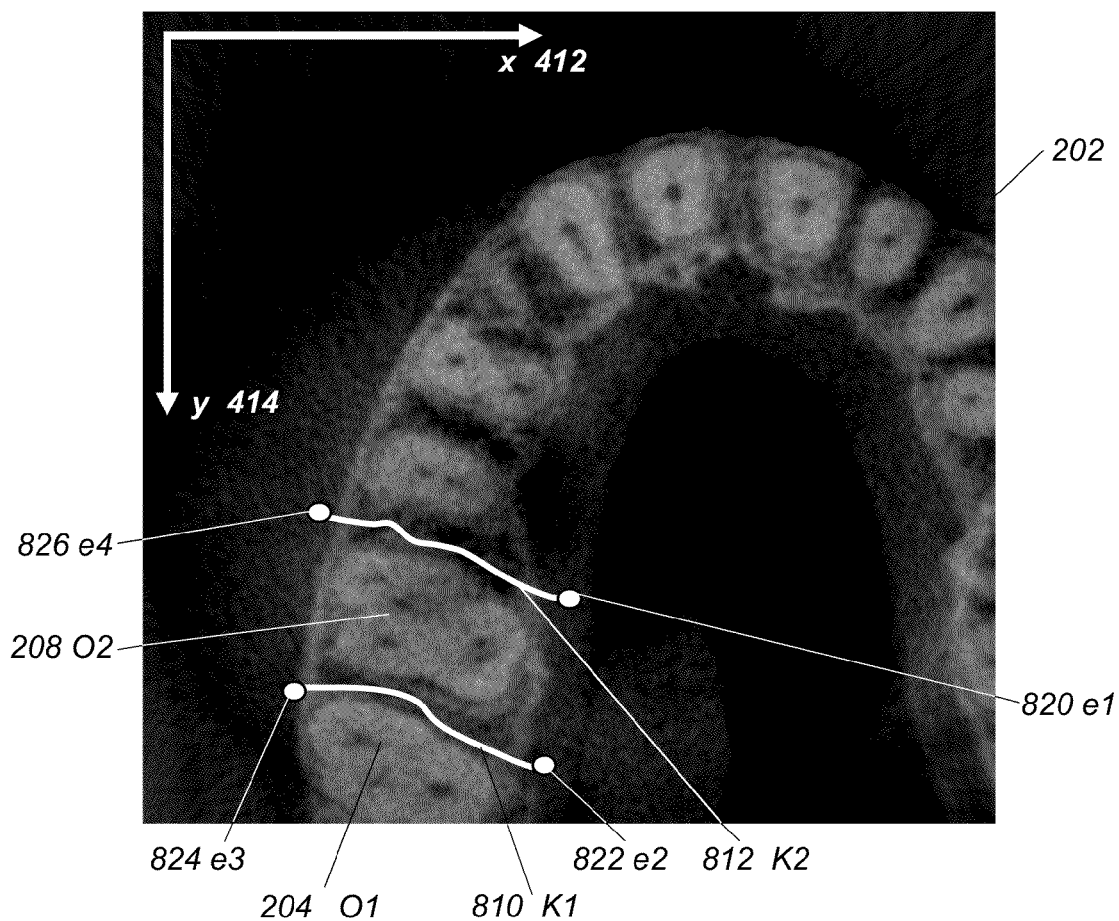
FIG. 8 is a view of one of the CBCT images with the mapped separation curves.

The above steps 702 through 708 of FIG. 7 are then repeated, applied to another edge (e.g. B2Right in FIG. 6A) to find another separation curve in the CBCT space. Continuing with this example, FIG. 8 shows two exemplary separation curves K1 810 and K2 812 formed in this manner. The four end points e1 (820), e2 (822), e3 (824) and e4 (826) determine four position vectors (x1, y1), (x2, y2), (x3, y3) and (x4, y4). To extract a sub-volume (denoted by SV), four parameters in x-y space are defined, namely, xLeft, xRight, yTop, yBottom. These four parameters can be obtained through computation, for example:

$x\text{Left}=\min(x1,x2,x3,x4)$, $x\text{Right}=\max(x1,x2,x3,x4)$, $y\text{Top}=\min(y1,y2,y3,y4)$, $y\text{Bottom}=\max(y1,y2,y3,y4)$, where the min( ) operation selects a minimum value from the entries, while max( ) selects a maximum value from the entries.

In mapping step 114 of FIG. 1, the positions of B2Top and B2Bottom are also mapped back to CBCT space. Note that B2Top>=1 and B2Bottom<=K, where K is the number of slices in the CBCT volume. Denote now a z-axis direction of the CBCT volume by z (that is, pointing into the paper in FIG. 8). The mapping of B2Top and B2Bottom to CBCT space generates:

$z\text{Top}=B2\text{Top}+z\text{Offset}$;

and $z\text{Bottom}=B2\text{Bottom}+z\text{Offset}$, where $1<=z\text{Offset}<<K$ depending on how curved sub-volume 130 for the arch is selected.

Next in the FIG. 1 sequence, an extraction step 116 extracts an object sub-volume (SV) 710 that encloses the object of interest. This object sub-volume is generated by executing the following:

$SV=CBCT(x\text{Left},x\text{Right},y\text{Top},y\text{Bottom},z\text{Top},z\text{Bottom})$, where CBCT( ) operation extracts a sub-volume SV from the CBCT volume using the six parameters xLeft, xRight, yTop, yBottom, zTop, zBottom. As is shown in FIG. 6B, object sub-volume 710 is then used to obtain data from CT volume image 120.

Figure 9:
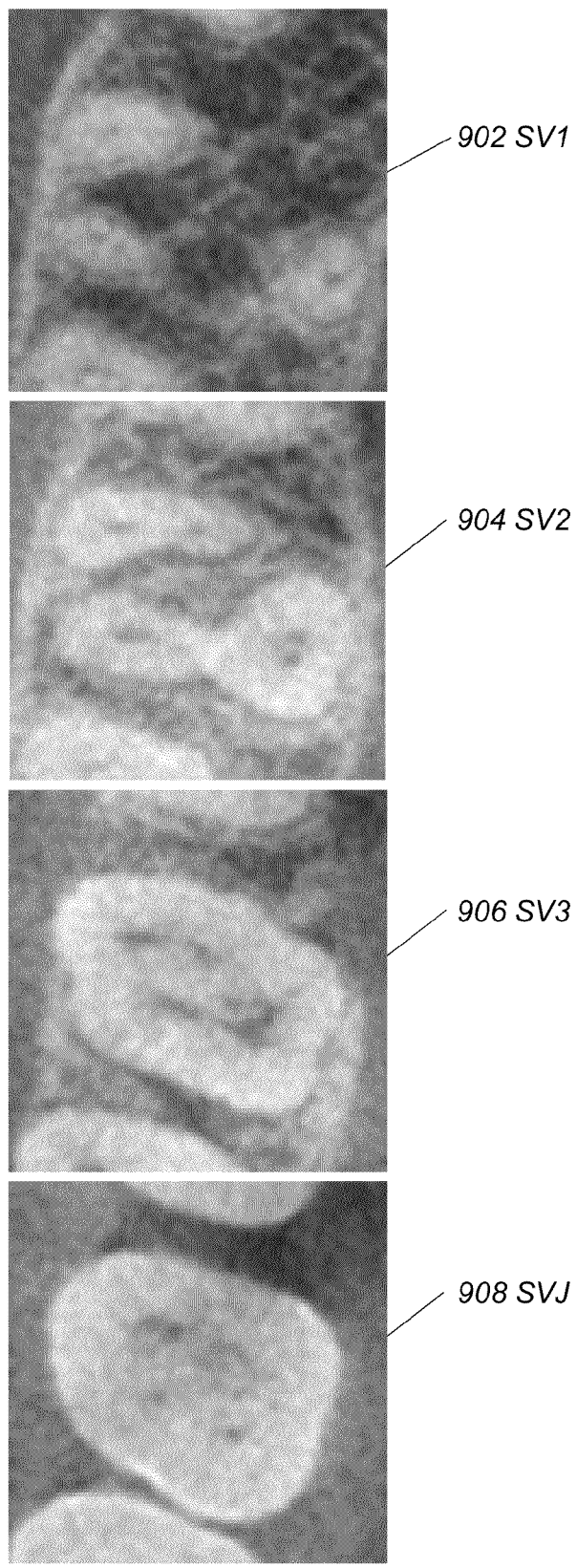
FIG. 9 shows a plurality of images of a sub-volume that contain an object of interest.

Exemplary slices of the sub-volume SV are shown in FIG. 9 as slices SV1 (902), SV2 (904), SV3 (906), and SVJ (908), where J=zBottom−zTop+1.

Figure 10:
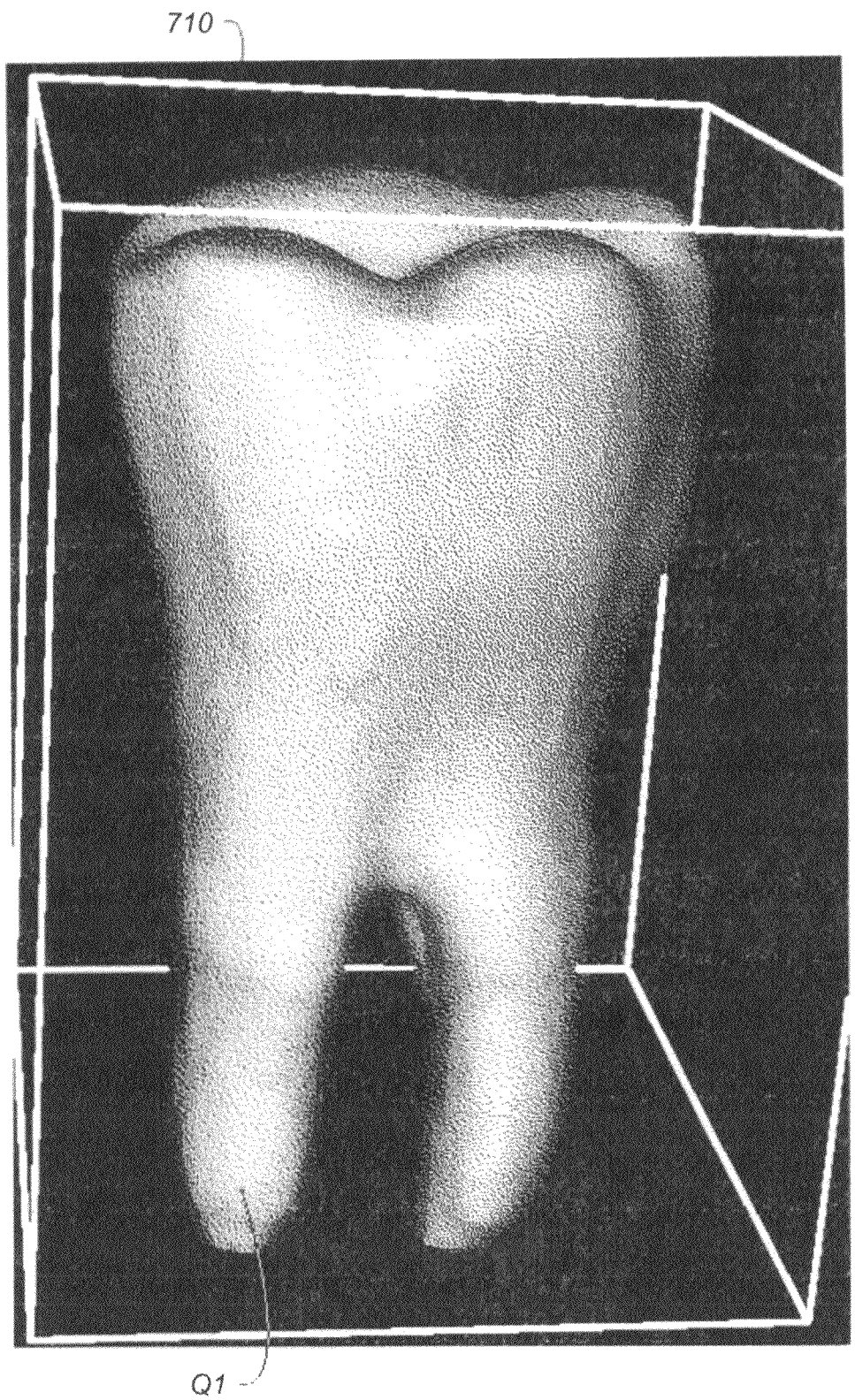
FIG. 10 is a view of segmentation results for an example tooth.

Display of the segmented tooth generally follows segmentation. An exemplary tooth segmentation result of the present invention is presented in FIG. 10.

User Assisted Segmentation

Referring again to the FIG. 1 sequence, following the extraction of the sub-volume the segmentation of the object of interest is carried out in a segmentation step 118. As noted previously in the background section, a number of segmentation methods are available for this purpose and are known to those skilled in the image analysis and processing arts.

Figure 11:
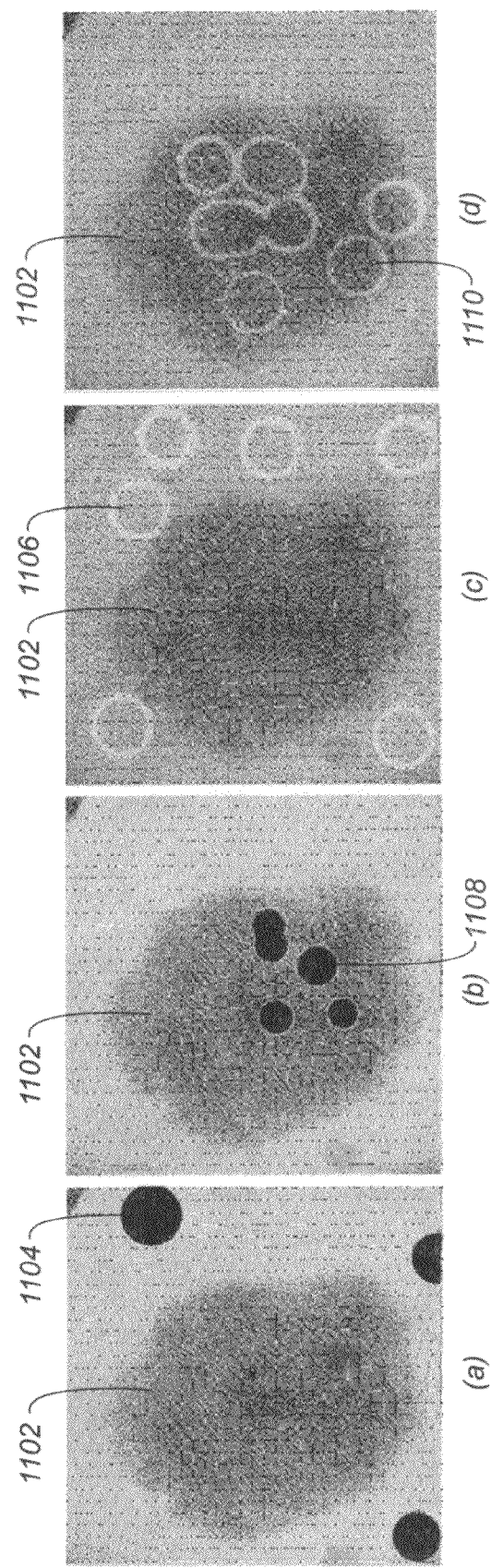
FIG. 11 is a view of a seed placement scheme for segmentation.

In one segmentation approach described by Sadgeghi et al. in the article "Hands-free Interactive Image Segmentation Using Eyegaze", SPIE Medical Imaging 2009, Vol 7260, a user-guided interactive segmentation method utilizes eye-gaze information as an input. The method includes three steps: 1) eyegaze tracking for providing user input, setting object (foreground) and background seed pixel selection; 2) an optimization method for image labeling that is constrained or affected by user input; and 3) linking the two previous steps via a graphical user interface for displaying the images and other controls to the user and for providing real-time visual feedback of eye-gaze and seed locations enabling the interactive segmentation procedure. To illustrate this method, FIG. 11 shows an example used by Sadgeghi et al. where there are shown a lesion 1102 and background seeds (e.g. 1104, 1106) and foreground seeds (e.g. 1108, 1110) identified using eyegaze tracking.

Figure 12:
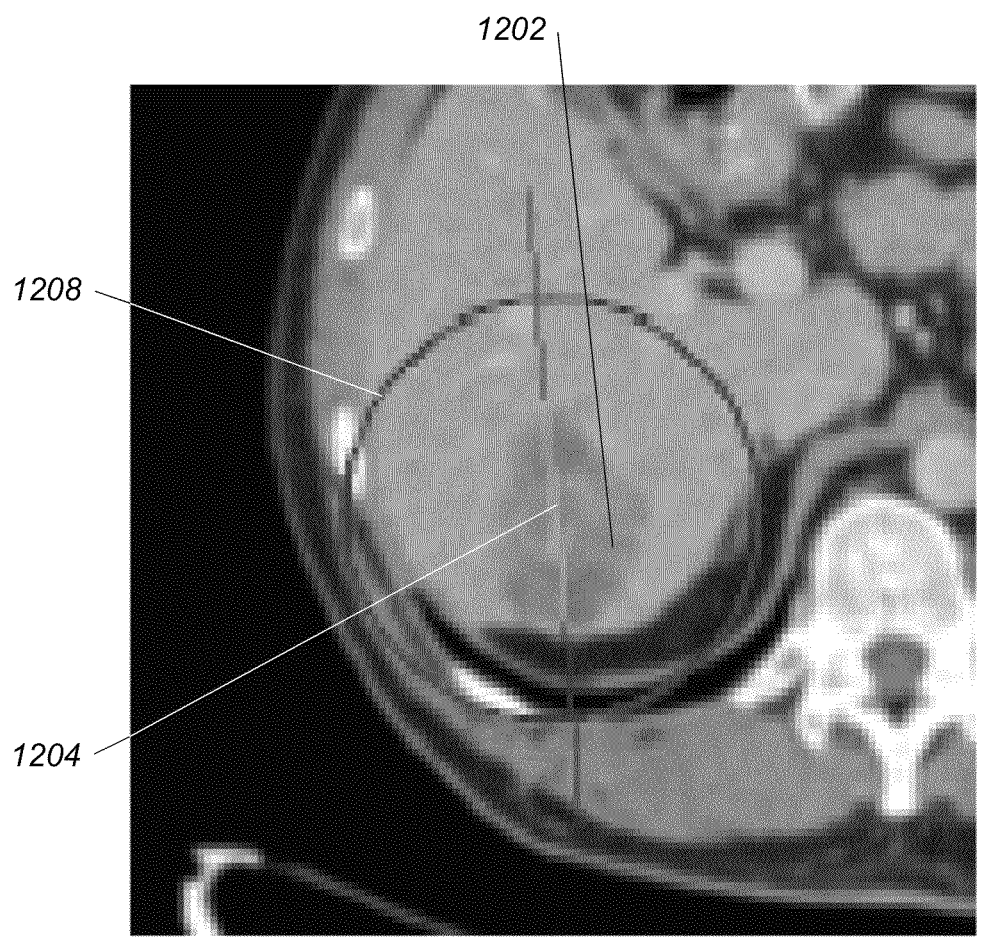
FIG. 12 is a view showing a segmentation scheme that accepts an operator stroke on the image for defining foreground and background image elements.

Other methods use input marks formed on the displayed image. For example, researchers Jolly and Grady describe a general purpose algorithm to segment lesions in CT images in an article entitled "3D general lesion segmentation in CT", ISBI 2008, pp. 796-799. The algorithm accepts a click or a stroke inside the lesion (foreground seed) from the user and learns gray level properties on the fly. Background information is then collected automatically. By way of example, FIG. 12 illustrates an example used by Jolly and Grady where there are shown a lesion 1202, a foreground stroke 1204 entered by a user and a background circle 1208 formed in response by a computer that can be used to obtain background seeds. As noted by the authors, region seeds can be defined using a mouse click point/selection or by using pixels identified after the stroke, such as background circle 1208, for example.

Background seeds can be identified using circle 1208 or stroke 1204. These researchers also stress the value of learning an intensity model, from the pixels on stroke 1204, for the lesion that is being segmented. With this approach, however, lesion shape information is missing from the user instruction. Furthermore, background seeds are limited to a system-generated circle shape, with size and location determined by the stroke placed by the user.

A suitable segmentation method is the GrowCut segmentation algorithm (see "GrowCut—Interactive Multi-Label N-D Image Segmentation By Cellular Automata," by Vladimir Vezhnevets, and Vadim Konouchine, *Int'l Conf. Computer Graphics and Vision* 2005). With this algorithm, the seeds for different type of regions of interest (e.g. foreground and background) are identified in the images by a user in the segmentation initialization stage or during intermediate stages.

Conventional user-assisted segmentation techniques accept input of a stroke or circle from the user and use this information to obtain intensity data that helps to get segmentation processing started. A notable shortfall of existing methods relates to the lack of shape information, since only intensity data along the line of the stroke is typically obtained. Embodiments of the present invention provide improved ways for placing (or editing) seeds in displayed medical images using geometric primitives, traced with reference to the image by the user.

Figure 13:
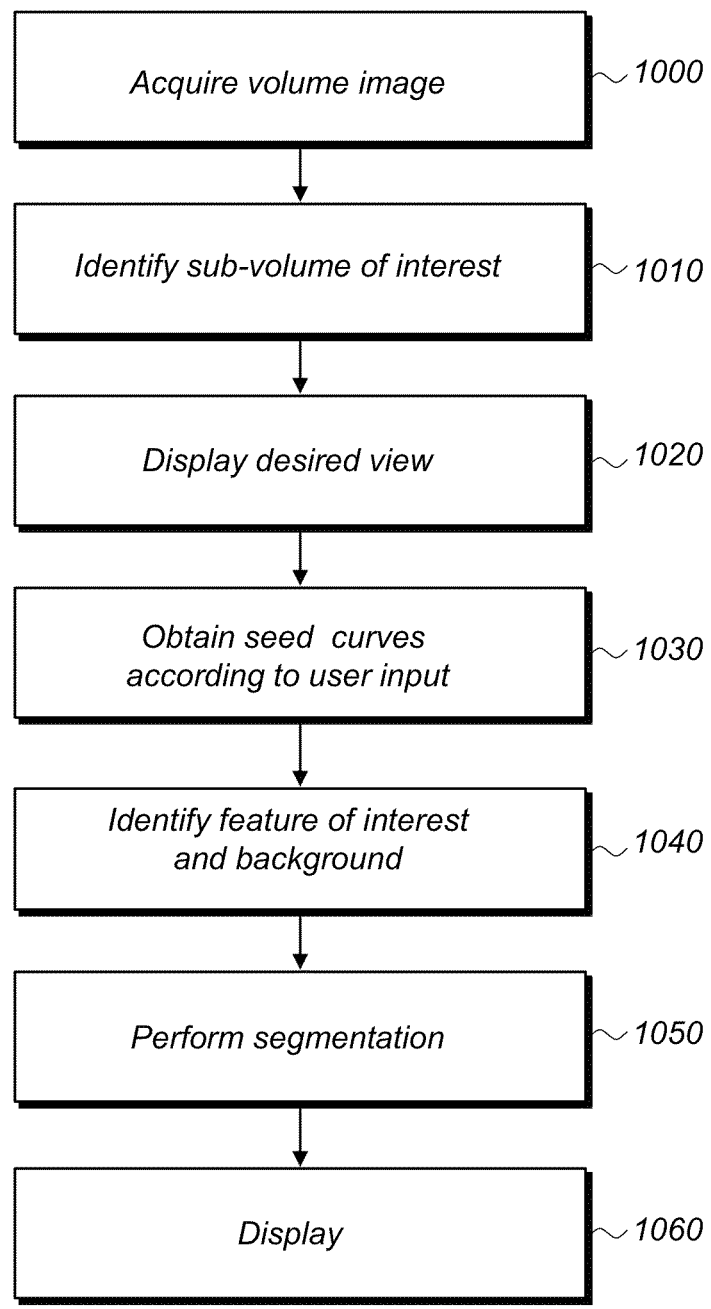
FIG. 13 is a logic flow diagram that shows a sequence of operations for viewer-assisted segmentation.

FIG. 13 is a logic flow diagram that shows basic steps that are used for user-assisted segmentation processing for segmenting a feature of interest according to an embodiment of the present invention. This processing runs on a computer or other logic processor, or on a networked processor, for example. In an image acquisition step 1000, a volume image, such as a CT or CBCT image, an MRI image, or other volume image type is acquired. The volume image is generated on a suitable volume image acquisition system and image data elements for the volume image are typically stored and obtained from an electronic memory, such as in a non-volatile data storage apparatus. A volume or sub-volume of interest (VOI) is identified from the volume image in a VOI identification step 1010, such as using the method outlined previously for the dental arch, for example. In a display step 1020, the viewer selects an appropriate view for providing segmentation markup, such as by paging through successive slices of an image of the VOI until a suitable slice displays. In an obtain user input step 1030, operator instructions for specifying seed data for segmenting an object of interest are obtained. The system responds to the user input by automatically generating foreground and background seed curves, used to obtain foreground and background data values, and displaying background hint information to the viewer in an identification step 1040. A segmentation step 1050 then executes segmentation based on the object or feature of interest identified and the foreground and background information that is generated as a result, to provide the tooth segmentation result of the present invention, as was shown in the example of FIG. 10. The segmentation results appear in a display step 1060. Once results are displayed, the viewer has the option to execute steps 1030 and 1040 again and to re-initiate segmentation in order to refine the initial segmentation results.

Figure 14:
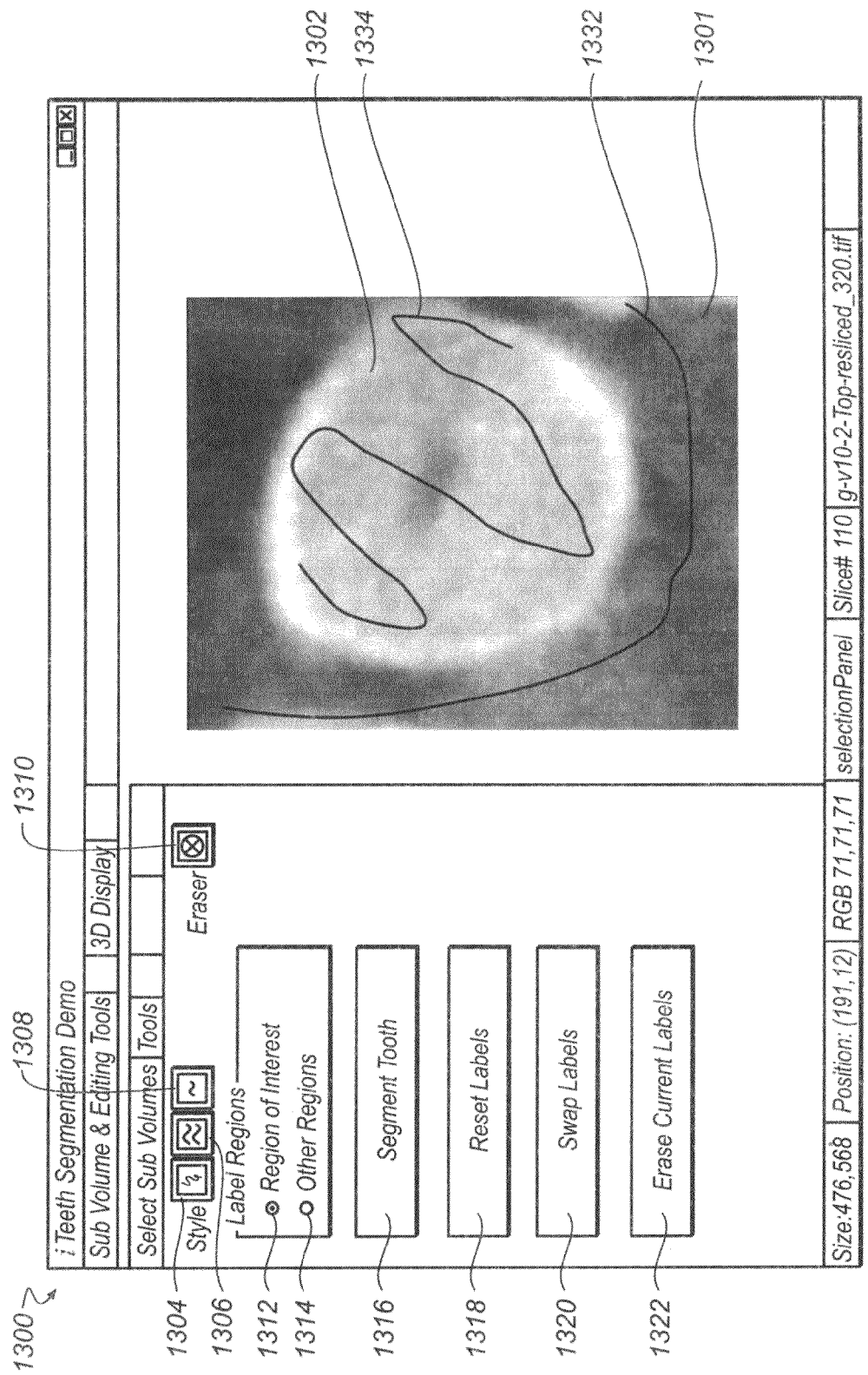
FIG. 14 is a plan view of an operator interface for viewer-assisted segmentation.

Referring to FIG. 14, an exemplary user editing interface 1300 for seed data entry and editing is shown. User editing interface 1300 provides the user with a number of exemplary functions and controls that facilitate seed style (or geometric primitive) selection, drawing, and correction. These functions are invoked by various screen selections, clicking on or pointing to and activating relevant control buttons, such as using a mouse pointer, touch screen, or other pointing devices, followed by tracing or other motion by the user.

The purpose of seed entry is to provide enough information for accurate automated segmentation from an unsegmented or poorly segmented image. Embodiments of the present invention apply one or more computer graphic utilities to the problem and enable the viewer to enter one or more segmentation seeds, with viewer selection of an appropriate seed style for the displayed image, using a predetermined set of graphics primitives. The graphics primitives are then used to generate foreground and background seed curves, as described subsequently.

Different seed styles can be selected using the interface of FIG. 14. Tools for selection and seed style entry include mouse, touch screen, and other available pointer and input devices. One exemplary seed style that can be selected uses a random freeform or "scribble" pattern, accessed using an on-screen control 1304. Selection of control button 1304 along with a control 1312 displays a region of interest of a tooth. The viewer can then trace a foreground identifying pattern 1334 in a displayed image slice 1301, using the user interface for a tooth region 1302. Then, with curve 1334 traced over the region of the tooth or other structure to be segmented, selection of another control 1314 specifies other regions, instructing the system to generate and display a background seed curve 1332 over the background area.

Figure 15A:
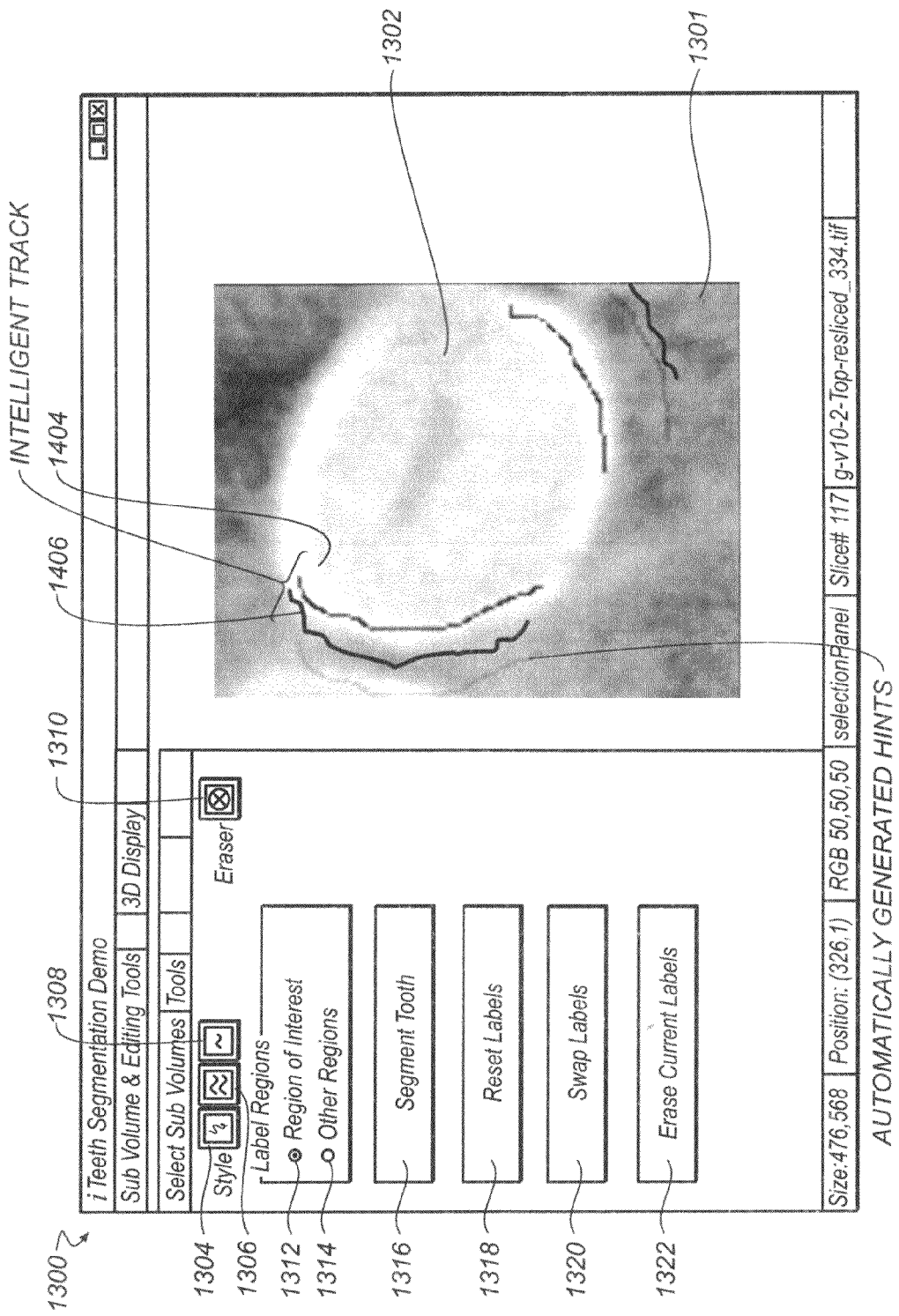
FIG. 15A is a plan view of an operator interface for viewer-assisted segmentation showing a boundary marking scheme according to an embodiment of the present invention.

Another exemplary seed style or geometric primitive that can be selected by the viewer is a "parallel track" primitive, initiated at a control 1306 using the interface of FIG. 14. Referring to FIG. 15A, generation of a parallel track is shown. Selection of control 1306 enables the user to draw a foreground identifying pattern 1404 in image slice 1301 for tooth region 1302. The underlying "intelligent track" function invoked by selection of button 1306 then automatically draws a background seed curve 1406 for the background, corresponding to the foreground identifying pattern.

Figure 15B:
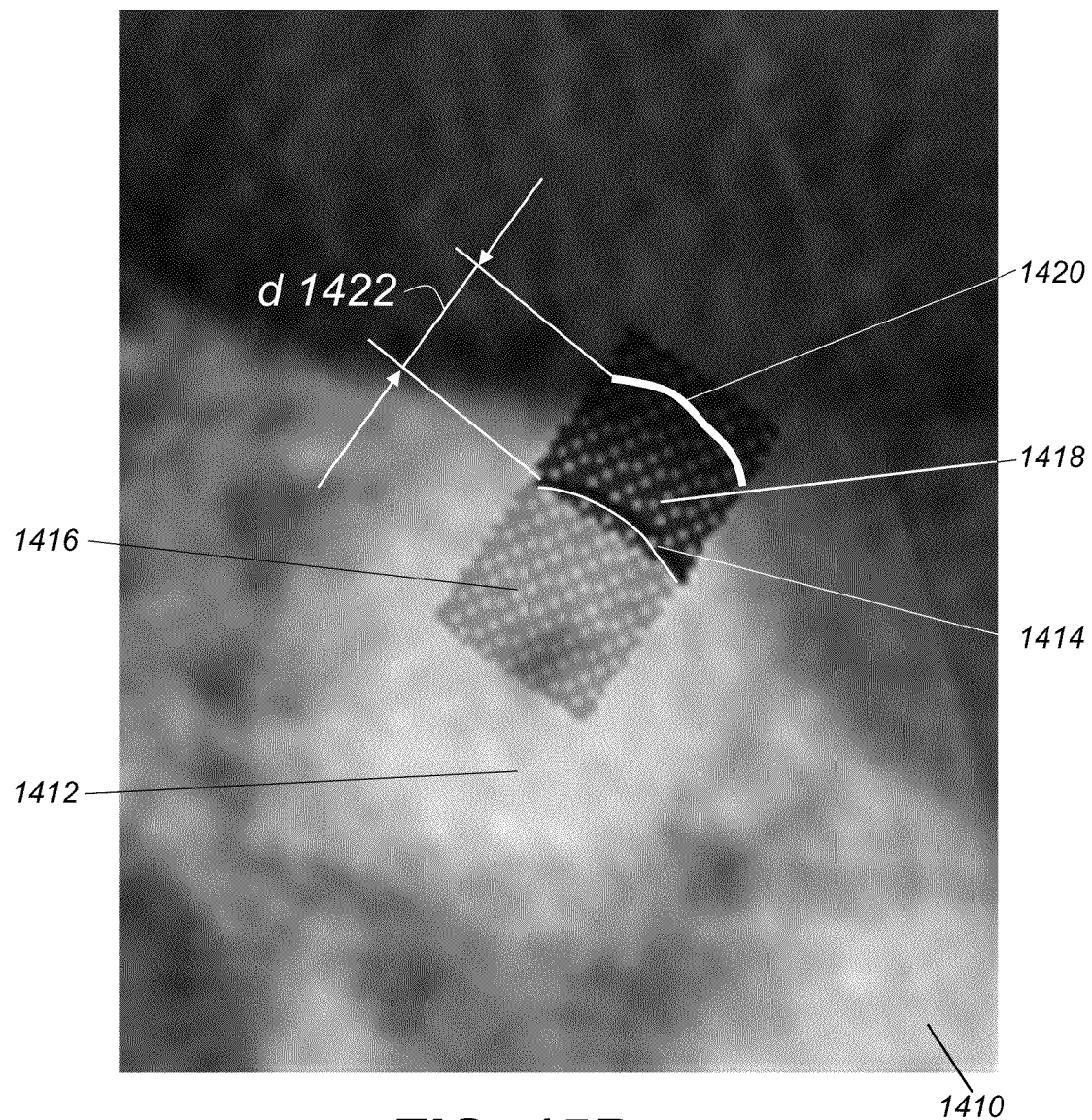
FIG. 15B is an enlarged plan view showing boundary curves generated according to user input.

FIG. 15B illustrates how the intelligent track is generated according to an embodiment of the present invention. There is shown a tooth region 1412 in an image 1410. The user draws a foreground identifying pattern that defines a foreground seed curve 1414, as described in more detail subsequently, inside the tooth region 1412 near the tooth region boundary. The method of the present invention identifies a portion 1416 of image 1410 bounded on one side of curve 1414 and another portion 1418 of image 1410 on the other side as illustrated in FIG. 15B. The portion 1416 could be of an exemplary rectangular shape or other appropriate shape. Portion 1418 could also be a rectangular or other shape. An average intensity value A1 is computed for portion 1412, an average intensity value A2 is computed for portion 1418. In this embodiment, if A2<A1, a background seed curve 1420 is drawn automatically as shown in FIG. 15B. Seed curve 1420 is parallel to seed curve 1414 with a predetermined distance d 1422 between them.

Figure 16A:
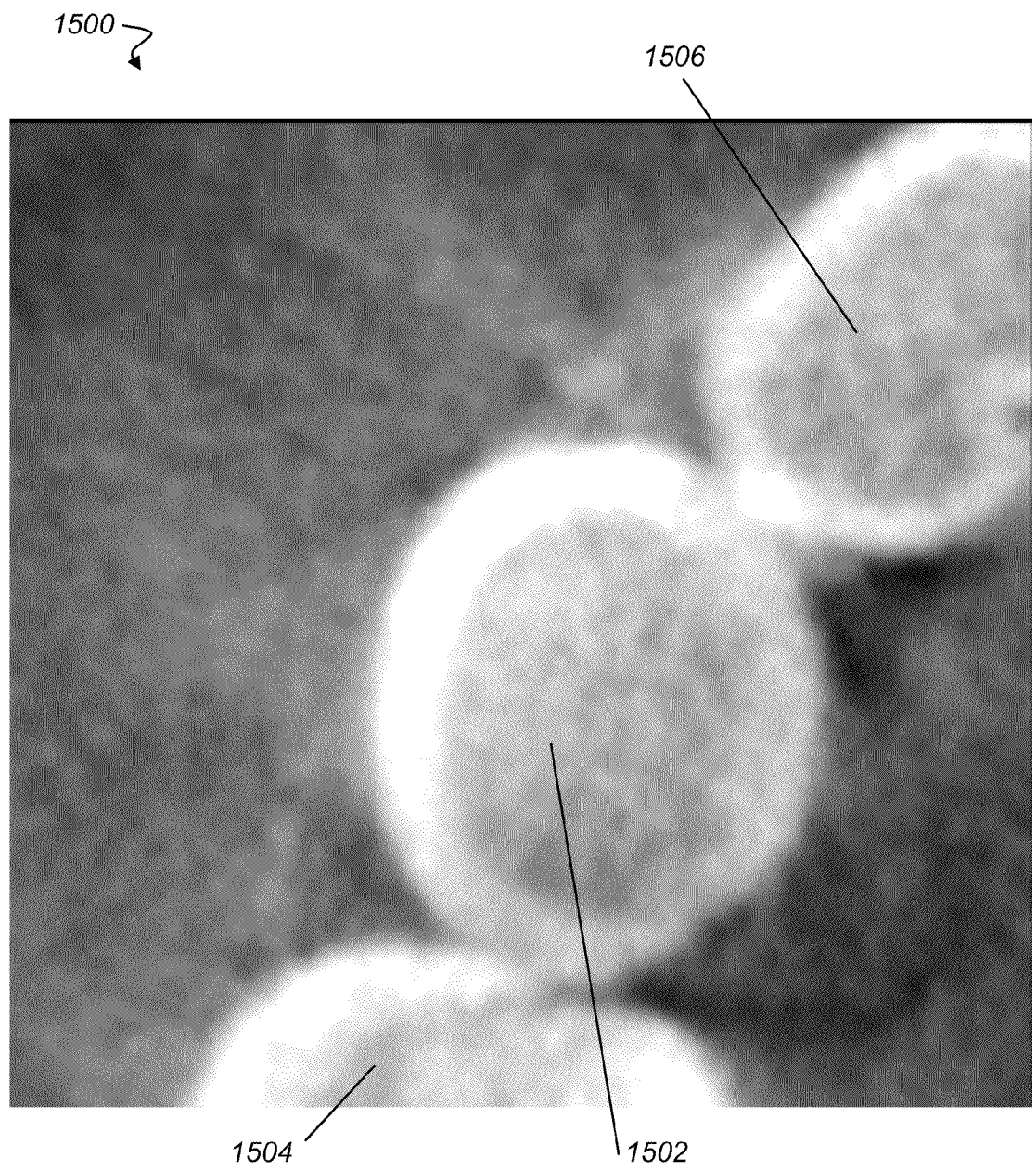
FIG. 16A is a plan view of an image slice that shows multiple teeth.
Figure 16B:
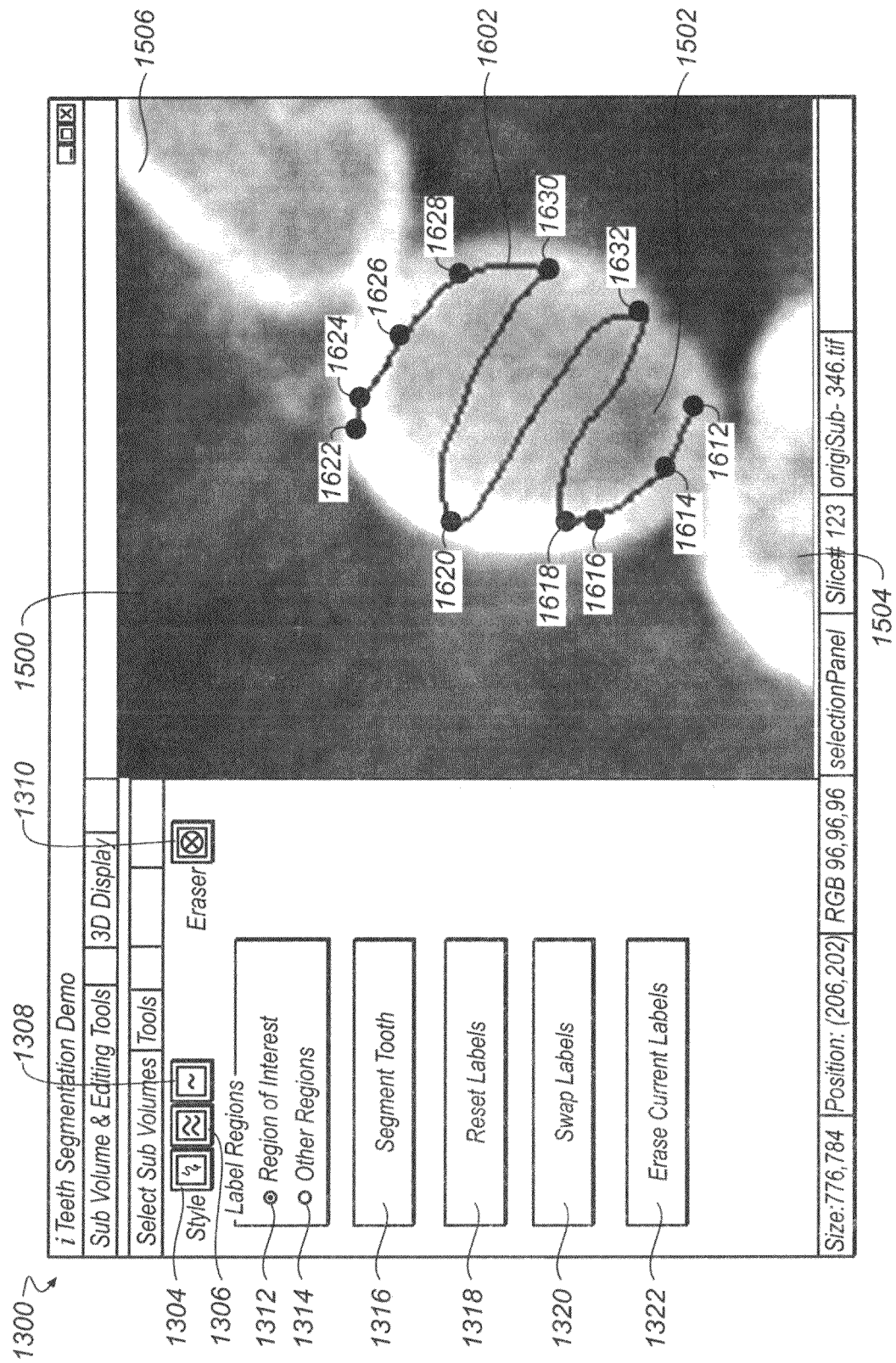
FIG. 16B is a plan view of an operator interface for viewer-assisted segmentation showing an alternate boundary marking scheme according to an embodiment of the present invention.
Figure 17:
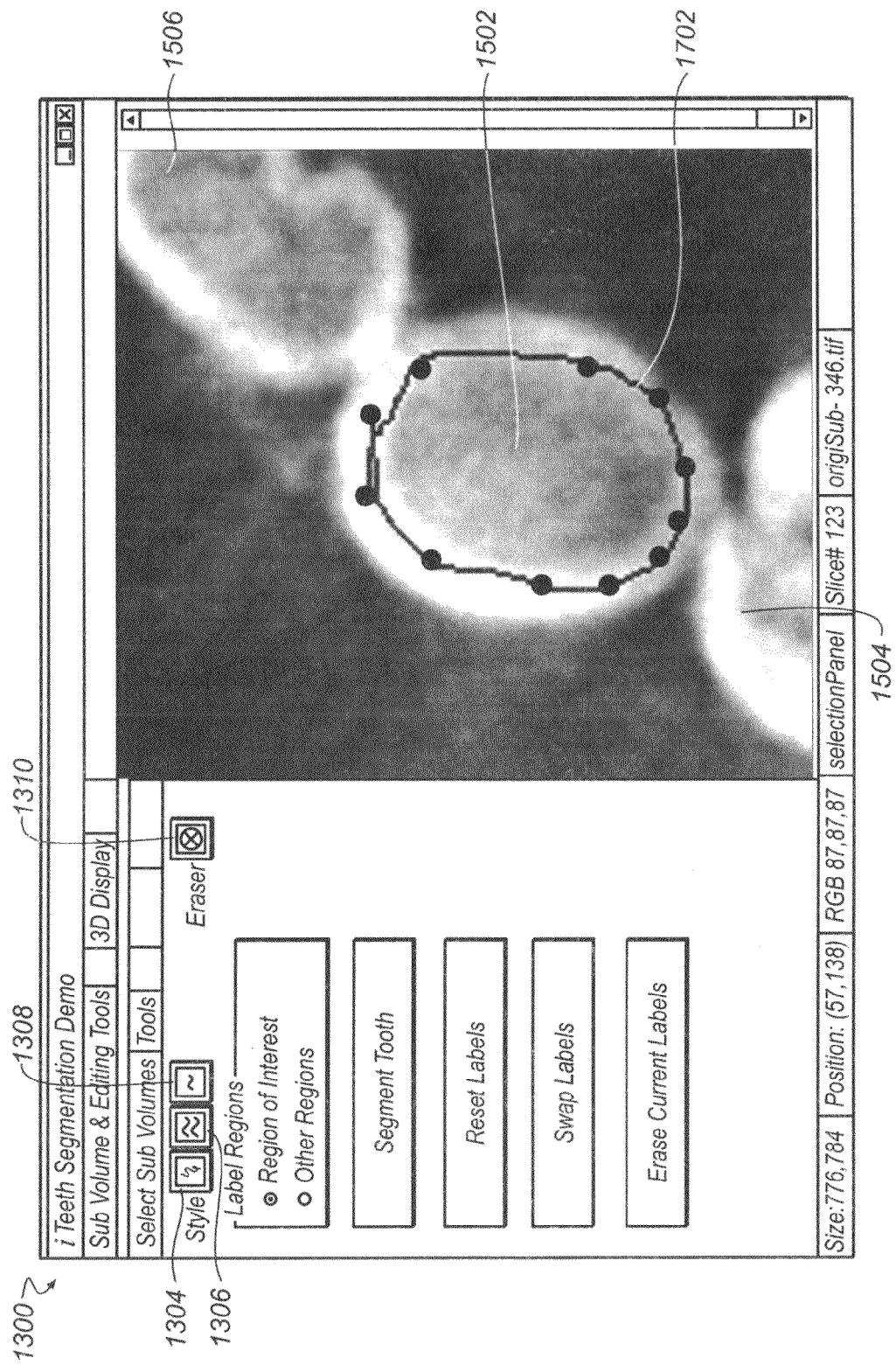
FIG. 17 is a plan view of an operator interface showing foreground seed curve generation for a boundary marking scheme according to an embodiment of the present invention.

Another exemplary seed style or geometric primitive that can be selected by the viewer is a "parallel convex hull", using a control 1308 in FIG. 14. In FIG. 16A, there is shown an image 1500 that displays a tooth region 1504, a tooth region 1502 and a tooth region 1506. In an exemplary case of segmenting tooth region 1502 as the region (or feature) of interest, tooth region 1504 and tooth region 1506 become part of the background. Using the operator interface of FIG. 16B, the user draws, within the tooth region, a foreground identifying pattern 1602 that contains a plurality of 2D points, a subset of which consists of "extreme" 2D points that are purposely placed near the tooth region boundaries and can be used to define the foreground seed curve that bounds foreground values used for segmentation. An exemplary set of "extreme" 2D points 1612, 1614, 1616, 1618, 1620, 1622, 1624, 1626, 1628, 1630, and 1632 are shown in FIG. 16B. FIG. 17 illustrates an exemplary foreground seed curve 1702 with exemplary "extreme" points indicated. Consistent with an embodiment of the present invention, foreground seed curve 1702 is generated automatically as the result of processing by the system, using information obtained from the graphics primitives traced by the user as the foreground identifying pattern. Foreground seed curve 1702 bounds foreground seed values to be used by subsequent segmentation processing. The background seed curve is formed to generally encompass or surround the area bounded by the foreground seed curve, spaced apart from the foreground seed curve and lying outside the foreground seed curve by a predetermined distance. Background values from the background seed curve are obtained from image data elements at the positions of the background seed curve or lying outside the background seed curve and, optionally, within a distance from the background seed curve, such as within no more than 10 pixels or 10 voxels away from the background seed curve, for example.

Figure 18A:
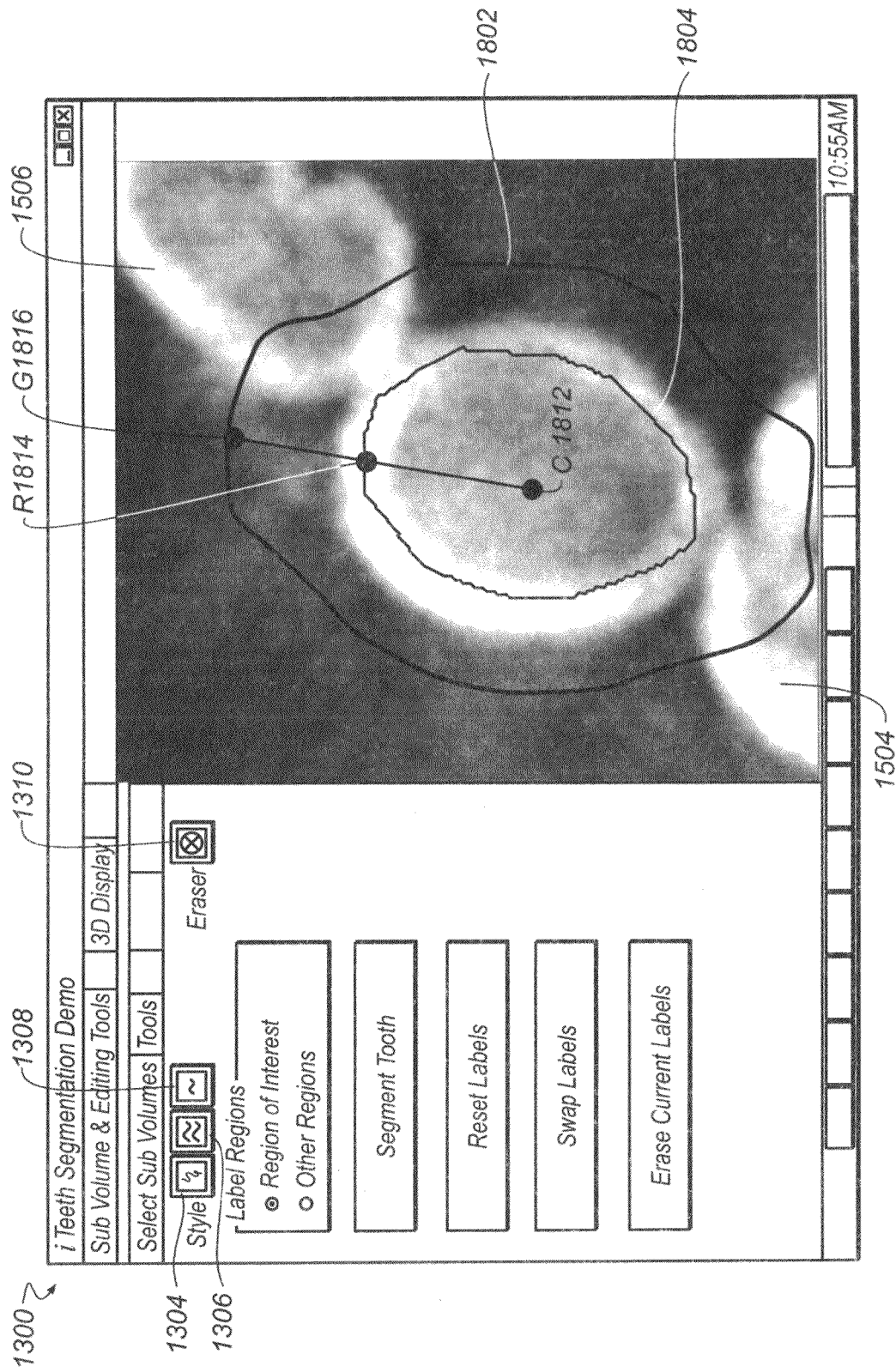
FIG. 18A is a plan view of an operator interface showing background seed curve generation for a boundary marking scheme according to an embodiment of the present invention.

In the example of FIGS. 16A-17, the subset of "extreme" 2D points are identified by applying a convex-hull detection algorithm to the foreground identifying pattern 1602. Convex hull techniques are familiar to those skilled in the image processing arts. One exemplary convex hull detection algorithm is published in "An Efficient Algorithm for Determining the Convex Hull of a Finite Point Set", by Ronald Graham, *Info. Proc. Letters* 1, 132-133 (1972). FIG. 18A shows a resultant convex hull 1804 for the foreground seed curve selection. In an embodiment of the present invention, this initial inner or foreground convex hull 1804, or an outline, is then used as a source to automatically generate a "parallel" outer or background convex hull 1802 or outline that encompasses the foreground convex-hull and that serves as the background seed curve for use in a subsequent segmentation procedure (previously described) that provides the background seed value. Convex hull 1802 extends across tooth regions 1504 and 1506, with image data elements that are regarded as background in this example.

The foreground seed curve for providing foreground seed values and for generating the "parallel" outer convex hull that provides the background seed curve could be any arbitrary geometric primitives that contain a set of "extreme" points that are near the tooth region boundaries. The background convex hull, or outer convex hull, such as convex hull 1802 in FIG. 18A, is an outline that encompasses the foreground convex hull and can be determined using a sequence such as the following:

a) Compute a geometric center, C 1812, of the foreground convex hull or inner foreground convex hull 1804.
b) Compute the distance CR between the center C 1812 and an "extreme" point R 1814 on inner convex hull 1804.
c) Extend line CR to CG, wherein point G 1816 is an "extreme" point on the background (outer) convex hull, such that the length CG=A*CR. An exemplary value of A could be 1.5.
d) Repeat steps b) and c) for other extreme points on inner convex hull 1804 to obtain corresponding points on outer convex hull 1802.

Figure 18B:
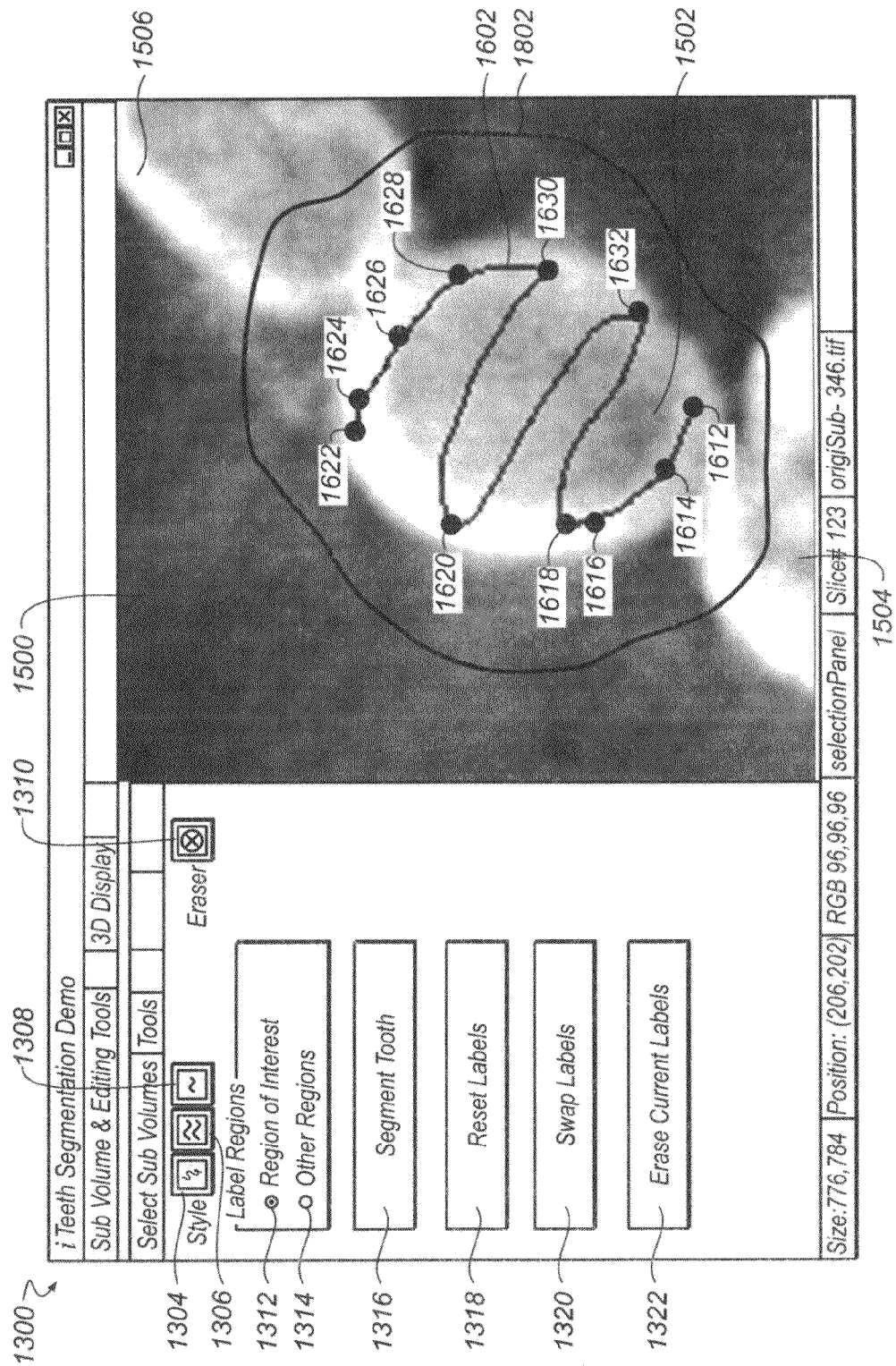
FIG. 18B is a plan view of an operator interface showing background seed curve generation for a boundary marking scheme according to another embodiment of the present invention.

Alternately, as shown in the user interface 1300 of FIG. 18B, the inner or foreground convex hull is omitted while the outer or background convex hull along with original user entries 1602 are displayed.

According to one embodiment of the present invention, image data elements that relate to the region or feature of interest and that are spatially bounded within the foreground seed curve are then used for selection of the foreground seed for segmentation. In the example of FIG. 18A, foreground seed values are generated from values on and/or within inner foreground convex hull 1804. The background seed curve is spaced apart from and spatially bounds the foreground seed curve, as shown at convex hull 1802 in FIG. 18A. Image data elements that on or lie outside the background seed curve are then used for generation of the background seed value. Points that lie between the foreground and background seed curves are not used for background or foreground seed generation. Thus, in FIG. 18A for example, image data elements that lie between inner hull 1804 and outer convex hull 1802 are not used as seed elements for segmentation but for the subject of segmentation.

Although foreground seed curves illustrated in FIG. 16B and FIG. 17 are single-stroke continuous curves, in practice they could be formed using multiple dots, lines, polygons, or arbitrary shaped curves or mixed geometric primitives. The above described method can be applied to one or more slices in a sub volume such as the exemplary slices SV1 (902), SV2 (904), SV3 (906), and SVJ (908) shown in FIG. 9.

The editing interface 1300 of FIGS. 14, 15A, and 16B-18B also provides the user with seed correction utilities. By selecting an "Eraser" control 1310, the user can remove an individual seed curve or pattern such as background seed curve 1406 or foreground identifying pattern 1404, such as by drawing a line across or otherwise selecting the individual seed curve, pattern, or portion of a pattern that is to be removed. The user can further remove all seed curves in a current slice that is displayed by clicking/selecting "Erase Current Labels" control 1322. In addition, the user has the option to swap the foreground and background seed curves in a current slice that is displayed by selecting a "Swap Labels" control 1320. Original foreground seed curves then become background seed curves, and original background seed curves become foreground seed curves.

The viewer also has the option to remove all the seed curves, background and foreground, in a sub volume by selecting a "Reset Labels" control 1318. This feature allows the viewer to re-edit foreground and background seed curves.

With the edited foreground and background seed curves, the preferred GrowCut segmentation algorithm is then applied to the sub volume after the viewer selects a "Segment Tooth" control 1316.

Figure 19:
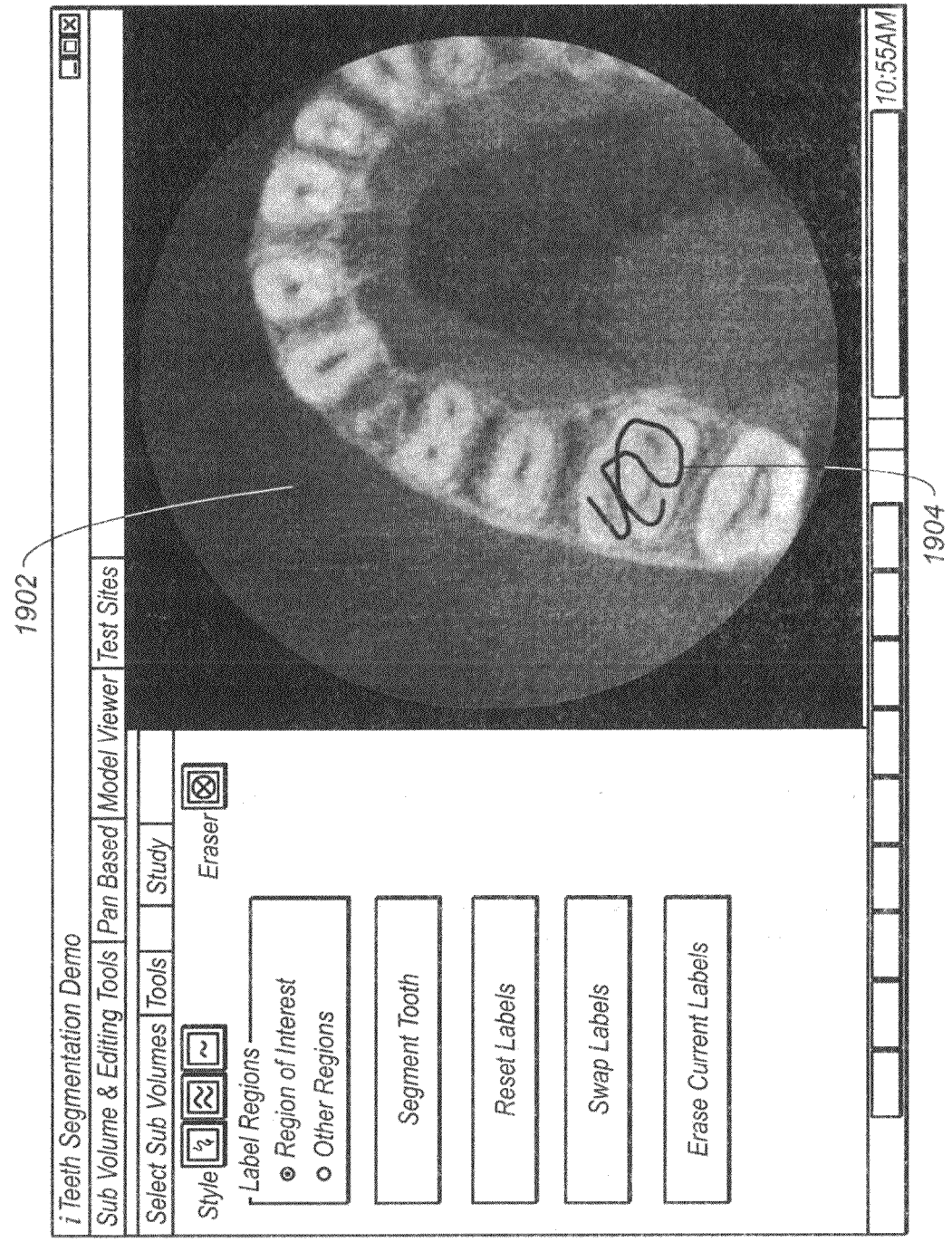
FIG. 19 is a plan view of an operator interface showing geometric primitives traced onto a volume image.

With respect to step 116 in FIG. 1, the method described hereinabove with reference to FIGS. 2-8 could be used for extracting an object sub-volume from the CBCT or other volume image. An alternate method for extracting the sub-volume is shown in FIG. 19 in which the whole CBCT image 1902 is presented. The user selects a tooth or other feature of interest by entering a pattern 1904 that may consist of points, lines or scribbles, for example. Similar patterns to pattern 1904 may be entered in different slices that contain the region of interest of a volumetric object, for example a tooth in a CBCT volume. In response, with the entered patterns, the method of the present invention computes a proper bounding cubic volume that encloses the tooth of interest. The entered patterns are also used to generate the inner or foreground seeds and outer or background seeds previously discussed. The segmentation steps described above are then applied to the sub set of the images within the bounding volume.

Embodiments of the present invention are particularly well-suited to address difficulties presented in tooth segmentation. The relatively complex structure of the tooth can make it difficult to accurately execute segmentation where a tooth is the feature of interest. Root structure, for example, tends to confound conventional segmentation algorithms; depending on the location of the slice in a tooth volume, segmentation can tend to over- or under-segment the structure, such as by inadvertently bridging the gap between roots, for example. The sequence shown in FIGS. 20-23 shows a case where this can easily occur and how segmentation using methods of the present invention adapts to handle complex structures such as portions of the tooth.

Figure 20:
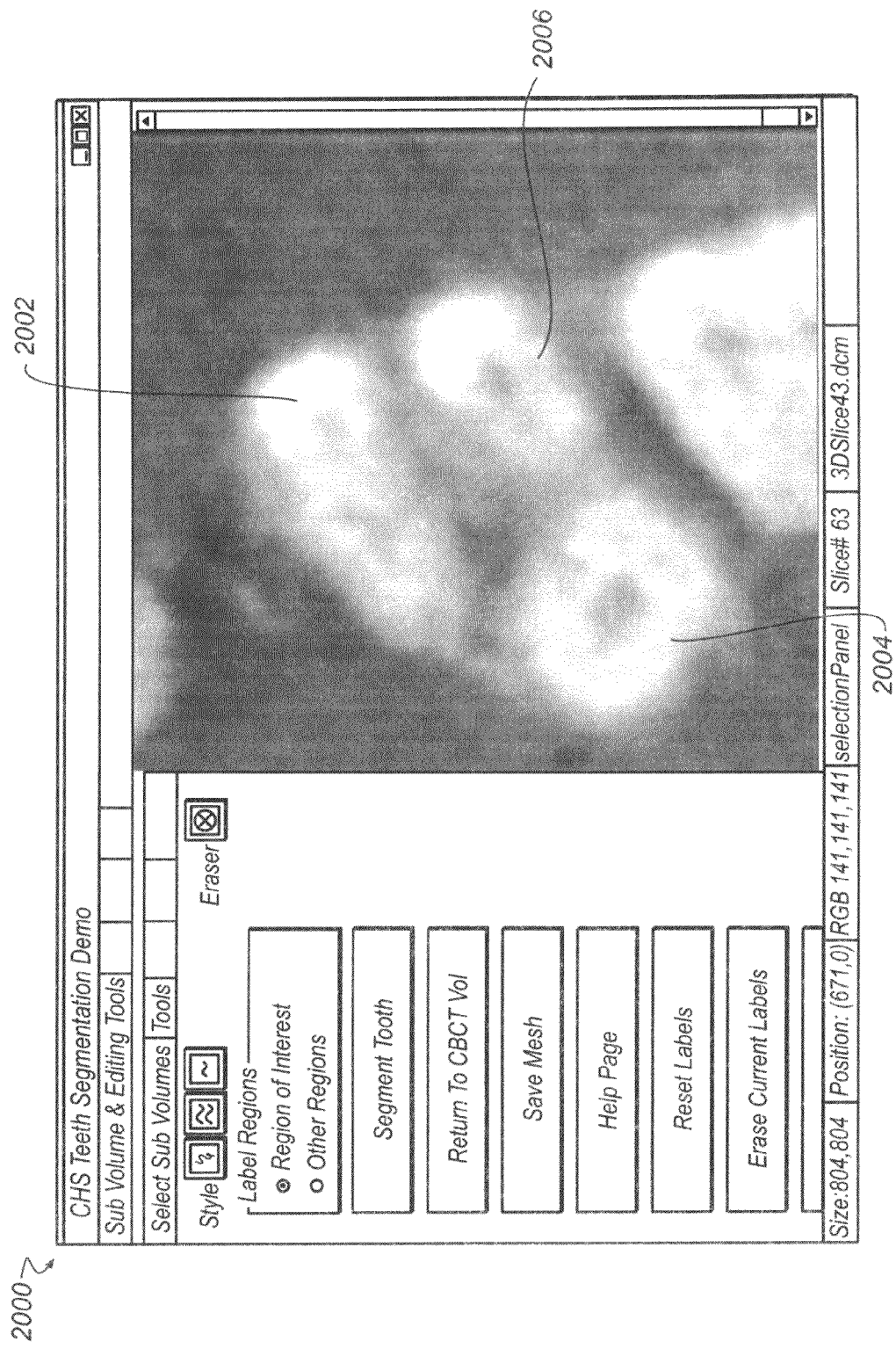
FIG. 20 is a plan view of an operator interface showing a tooth having multiple structures.
Figure 21:
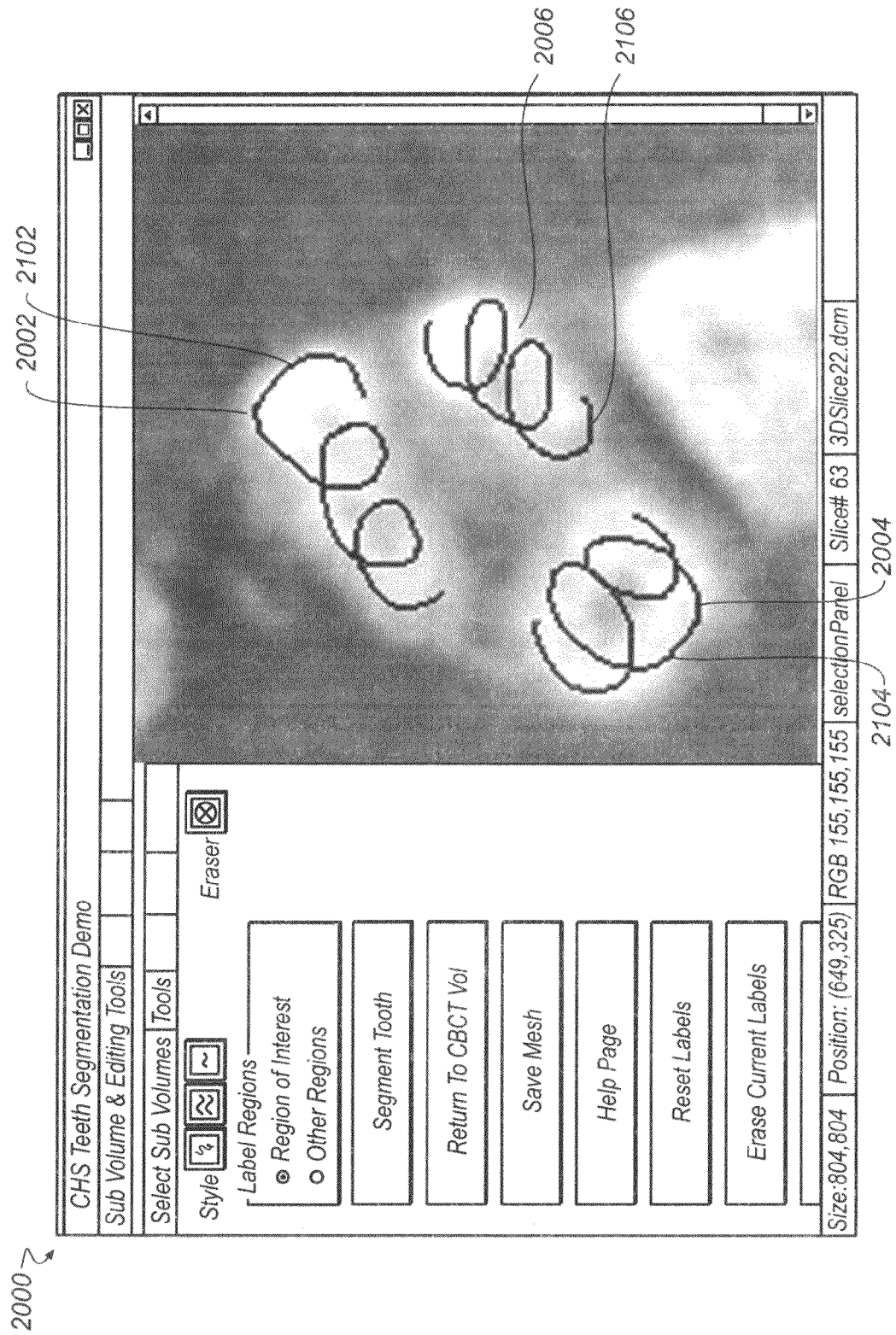
FIG. 21 is a plan view of an operator interface showing operator tracing onto the structures of FIG. 20.
Figure 22:
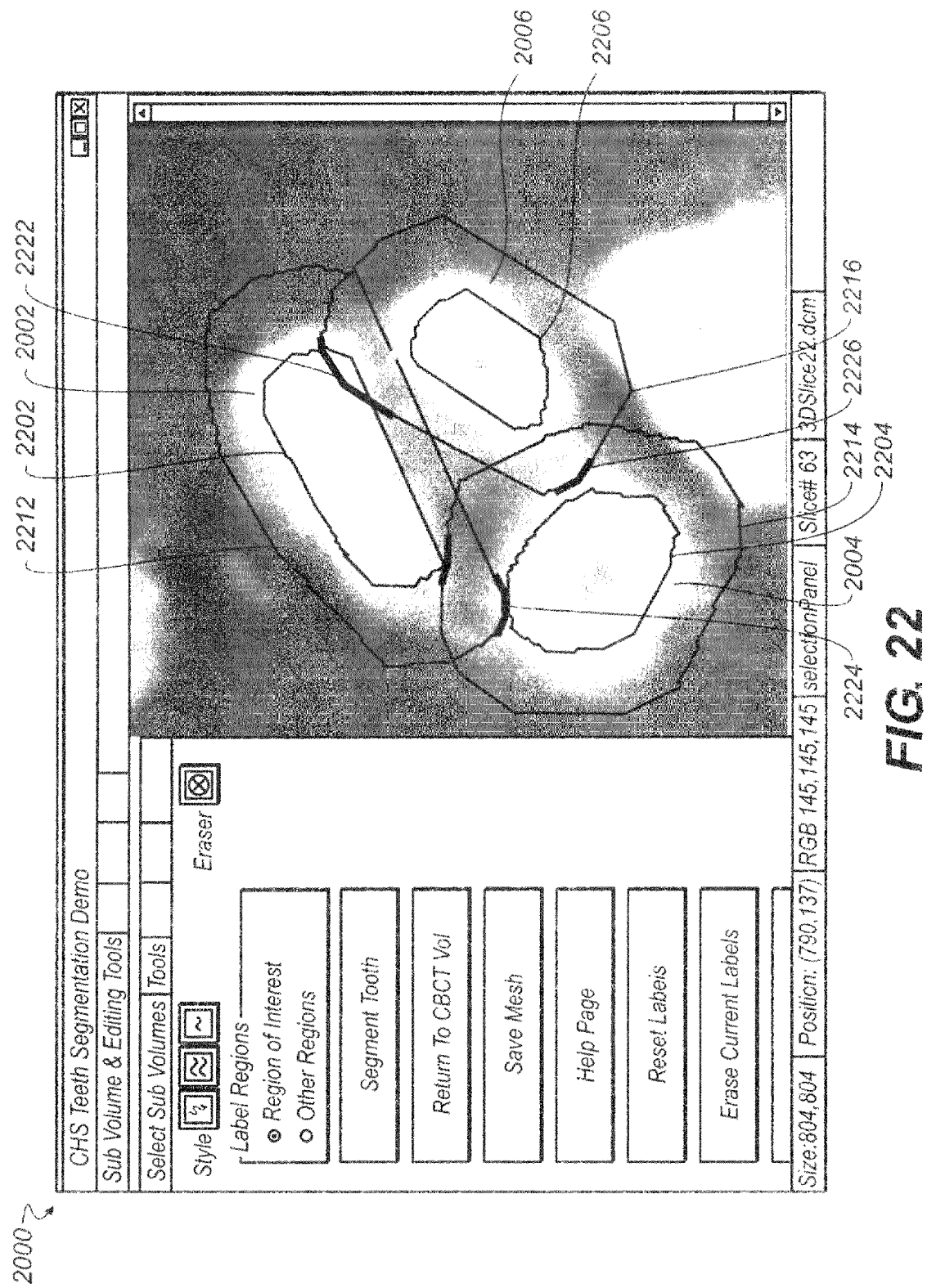
FIG. 22 is a plan view of an operator interface showing foreground and background seed curves generated according to user input.

FIG. 20 shows an image 2000 that provides a sectioned view of the tooth showing structures 2002, 2004, 2006 that can be parts of the same tooth, such as a portion of the root structure, for example. Conventional segmentation methods may tend to group structures 2002, 2004, and 2006 together as a single structure, causing errors or poor performance of subsequent segmentation processing. FIG. 21 shows the use of graphics primitives, traced onto the tooth image by the user, for defining the foreground and obtaining foreground seed values. In the particular example shown, scribble tracings 2102, 2104, and 2106 are entered by the viewer for this purpose. Initial system response for foreground and background definition given the input of FIG. 21 is shown in FIG. 22. Foreground seed curves 2202, 2204, and 2206, used for foreground seeding, are first generated according to graphics primitives entry. Background seed curves 2212, 2214, and 2216 are then generated based on the foreground seed curves 2202, 2204, and 2206. Overlapping of the seed curves, and of areas very near the seed curves is shown in thicker lines as overlap segments 2222, 2224, and 2226. It can be appreciated that these overlapped curves, defining areas as both foreground and background at the same time, can be sources of confusion to segmentation processing.

Figure 23:
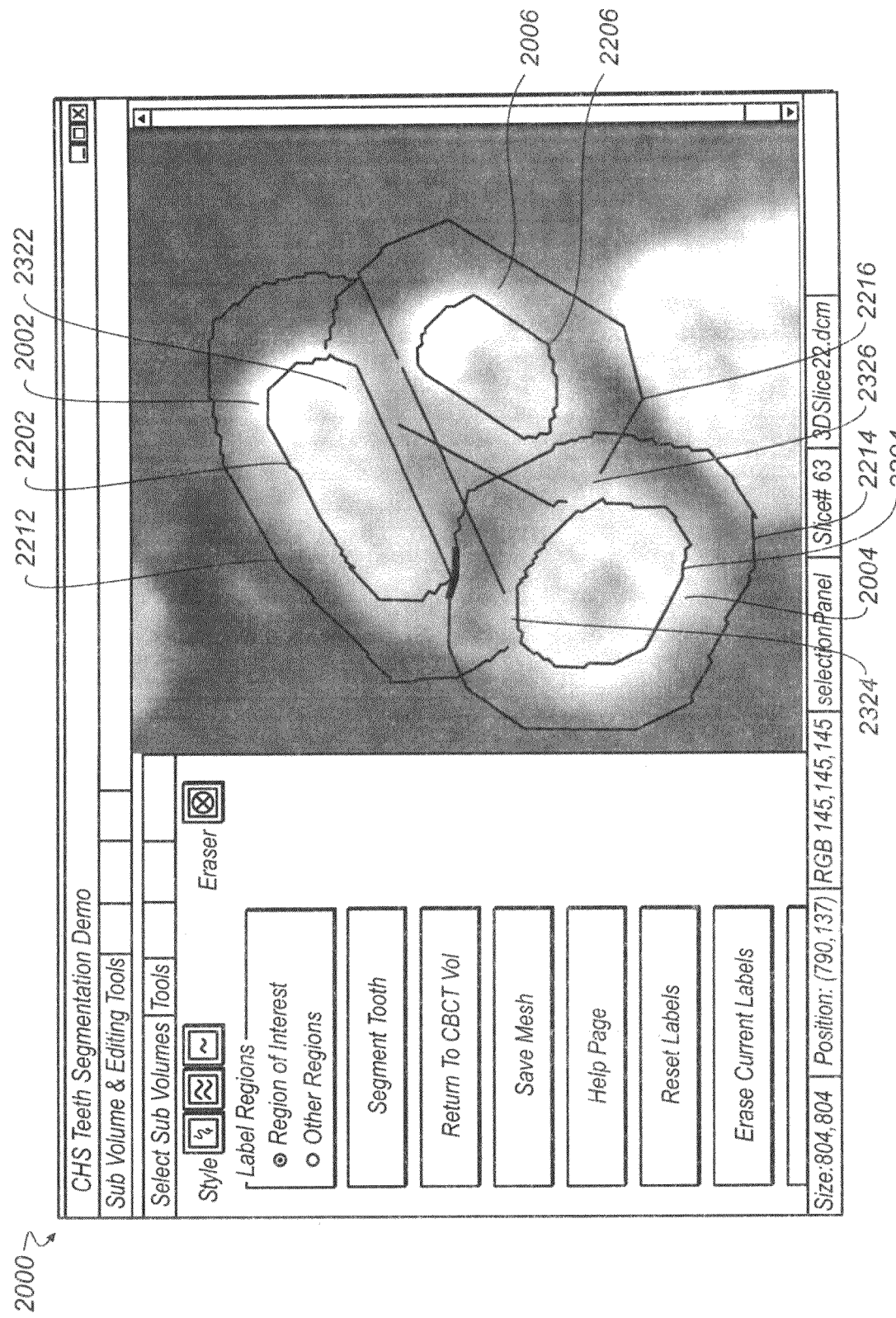
FIG. 23 is a plan view of an operator interface showing adjustment of background seed curves to correct for near proximity and overlap with foreground seed curves.
Figure 24:
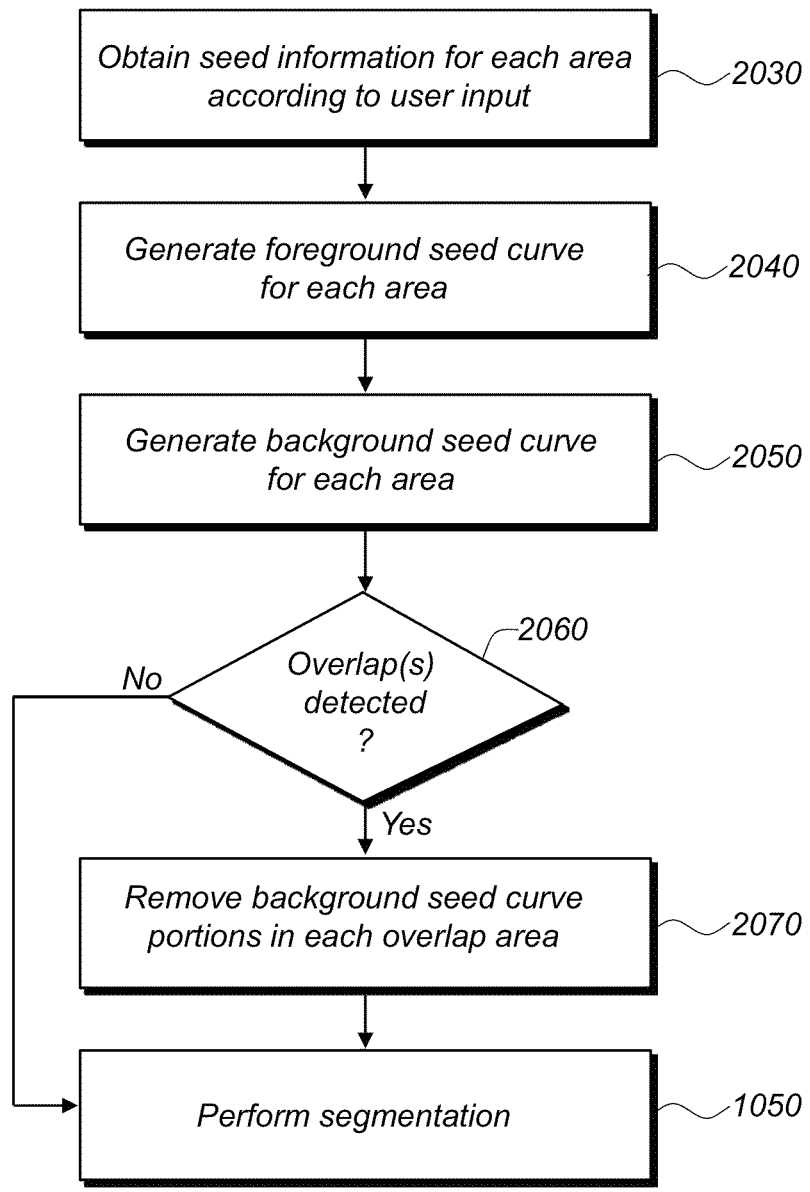
FIG. 24 is a logic flow diagram that shows the processing sequence for overlap compensation.

FIG. 23 and the logic flow diagram of FIG. 24 show how this condition is handled, where more than one object of interest is identified in a displayed image, according to an embodiment of the present invention. Where a background seed curve intersects, overlaps, or comes within a predetermined close distance to a foreground seed curve, a portion of the background seed curve is removed. An obtain seed information step 2030 obtains the seed information for the foreground feature of interest according to graphics primitives entry by the user, as described previously. In a foreground seed curve generation step 2040, the system generates the foreground seed curves used to define the foreground seed information. In a background seed curve generation step 2050, the system then generates the background seed curve corresponding to each foreground seed curve. A test step 2060 checks for overlap or close proximity between any portions of the background seed curves with any part of the foreground seed curves. Where no intersection, overlap, or proximity is detected, segmentation step 1050 can be executed. Where there is a conflict between foreground and background seed curve coverage, as was shown with respect to FIG. 22, an overlap correction step 2070 executes, systematically removing portions of the background seed curve that violate space defined by the foreground seed curves. FIG. 23 shows gaps 2322, 2324, and 2326 that are formed by this processing. This effectively removes pixel or voxel values in the corresponding areas of the image from being used as background seeds for segmentation processing in the subsequent segmentation step 1050.

Figure 25:
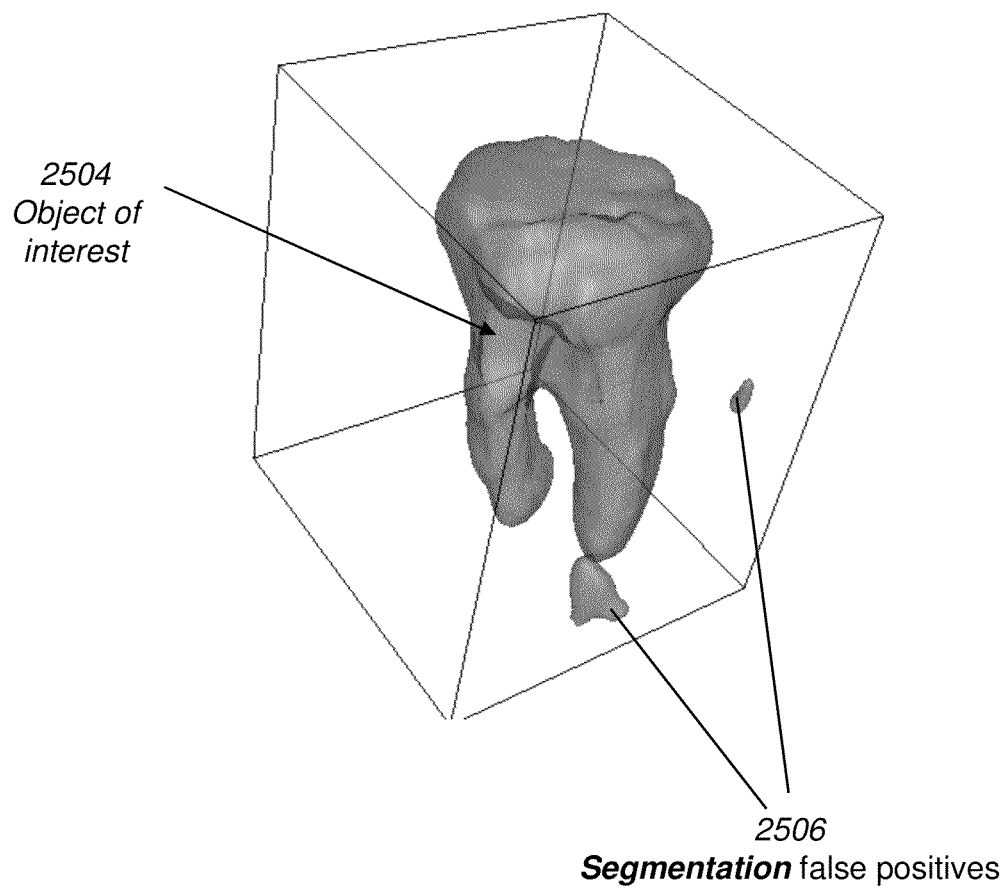
FIG. 25 is a perspective view that shows over-segmentation with false positives.

One problem that can occur when using segmentation techniques is over-segmentation, as a result of which one or more false positives (FPs) occur. FIG. 25 shows an example in which there is an object of interest 2504 and two false positives 2506. False positives 2506 may be, for example, from neighboring teeth or bone structures. False positives often occur from features that touch or very nearly touch.

Figure 26A:
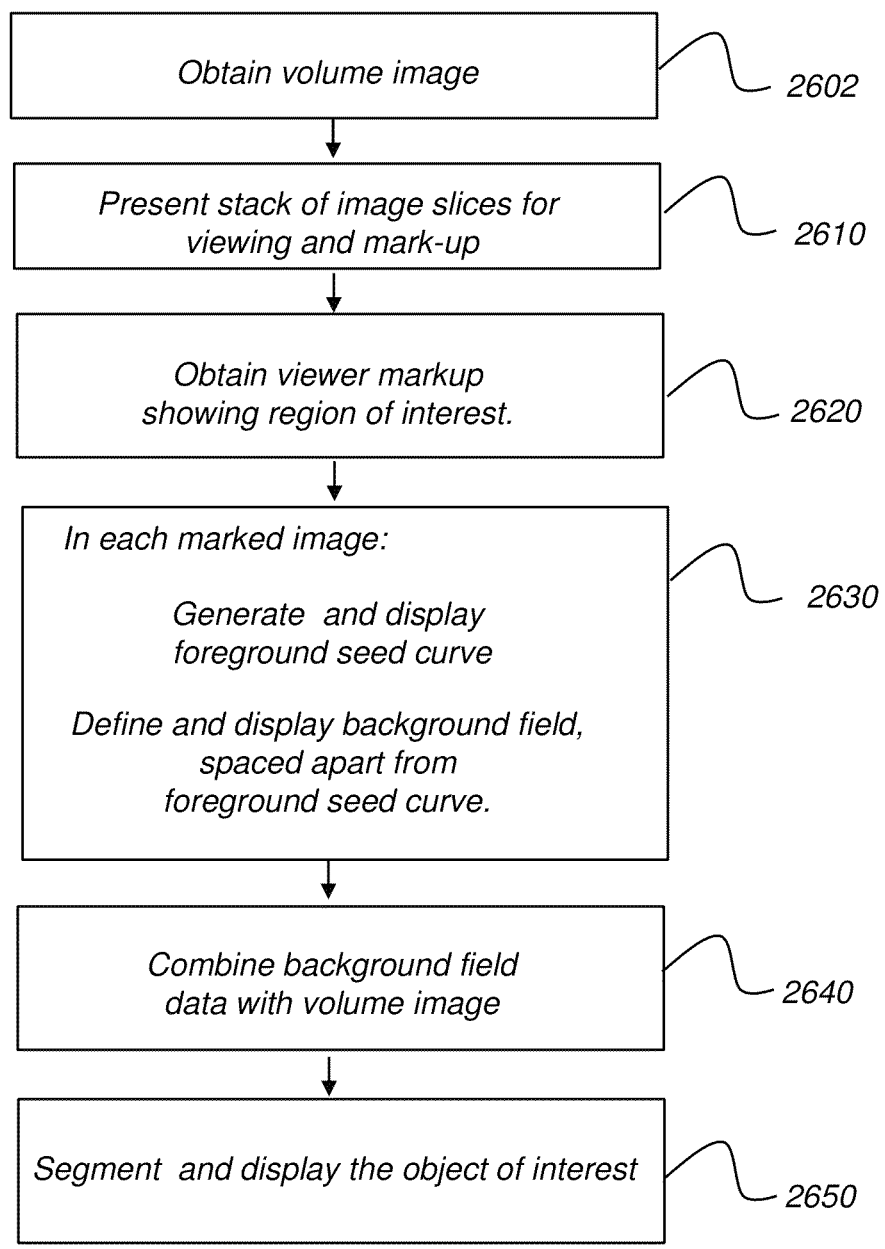
FIG. 26A is a logic flow diagram showing segmentation steps according to an embodiment of the present invention.

The logic flow diagram of FIG. 26A gives a sequence of steps for improved segmentation, with methods that can help to reduce or eliminate false positives such as those shown in FIG. 25. An image data acquisition step 2602 obtains the volume image from its set of individual projection images, as described previously with respect to FIG. 1. In a presentation step 2610, image slices from the reconstructed volume image are then presented to the viewer for markup of foreground content that defines the region of interest (ROI) for identifying the object of interest. According to an embodiment of the present invention, the viewer is able to page through and mark up one or more members of a set of image slices.

Figure 26B:
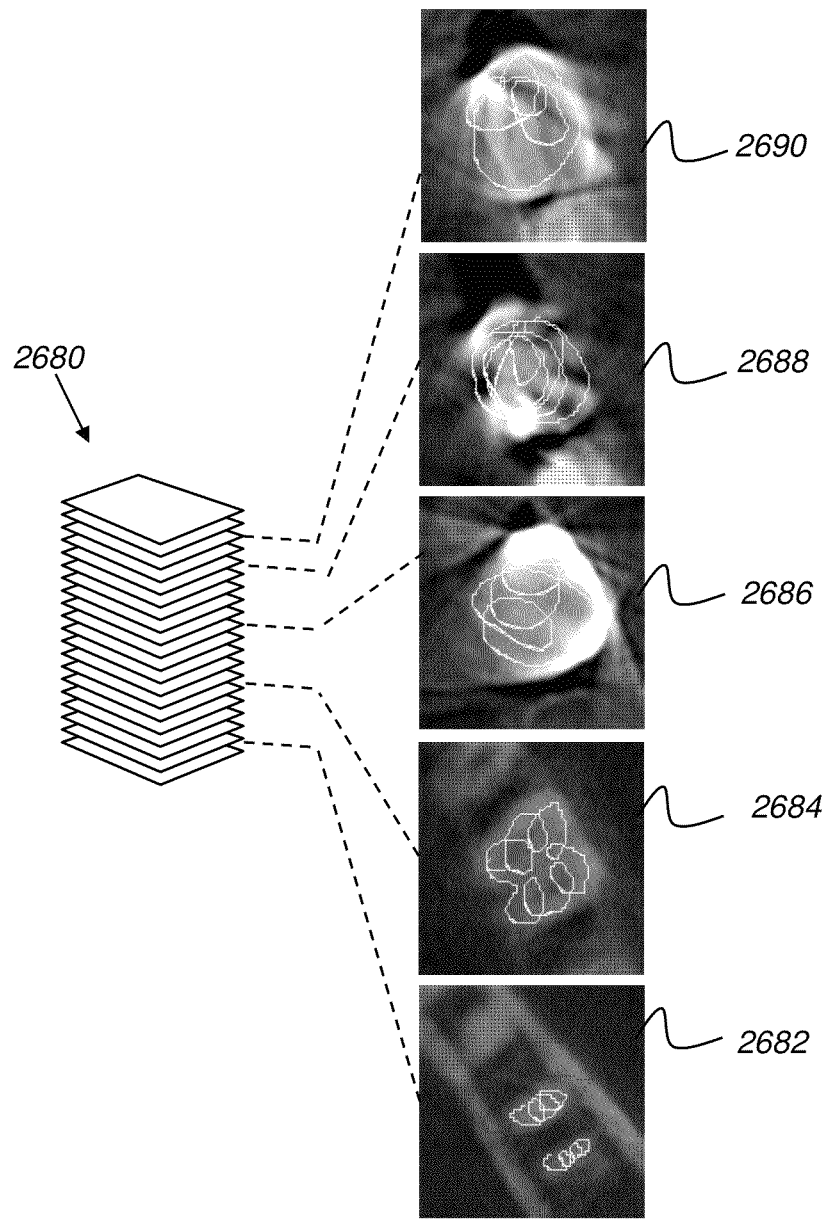
FIG. 26B is a schematic diagram that shows a set of image slices with markup provided on a number of member image slices from the set.
Figure 27A:
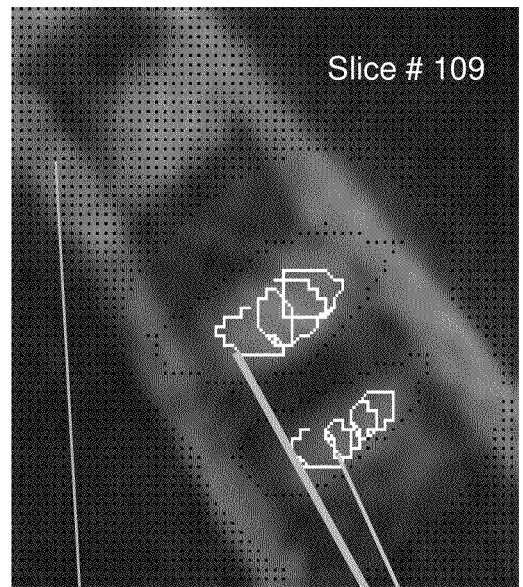
FIGS. 27A, 27B, 27C, 27D, and 27E are plan views of marked-up image slices for providing segmentation hints.
Figure 27B:
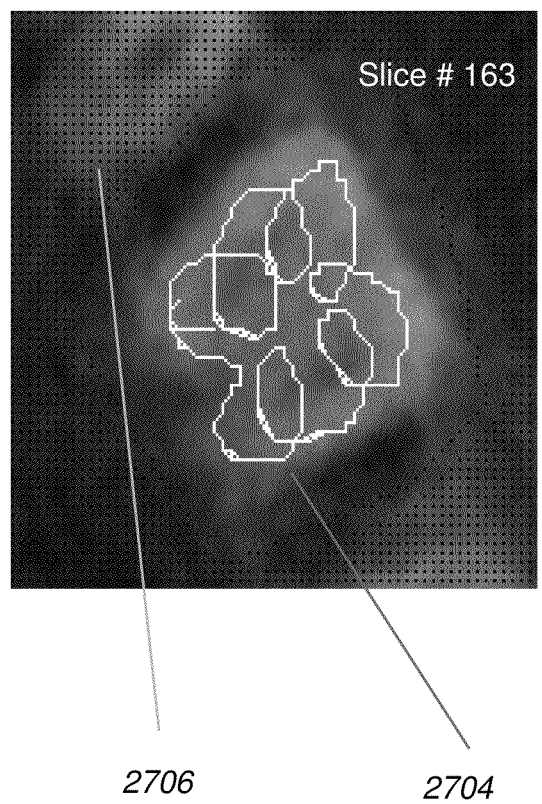
Figure 27C:
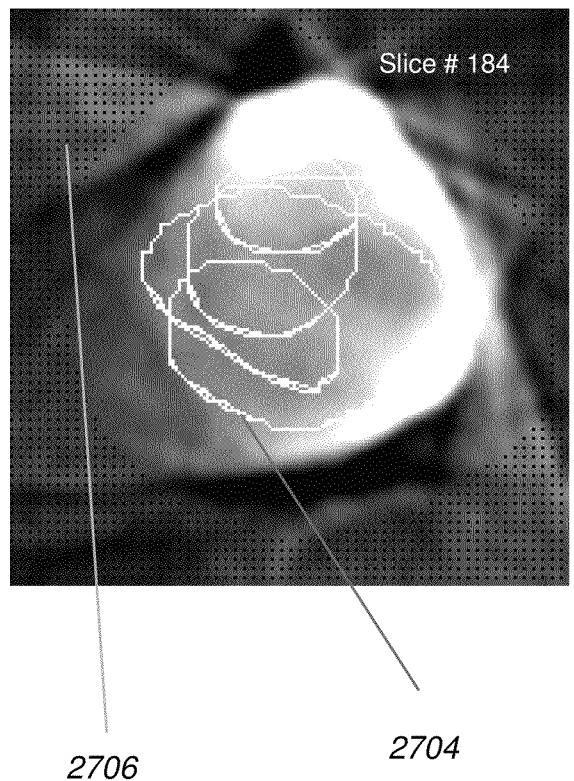
Figure 27D:
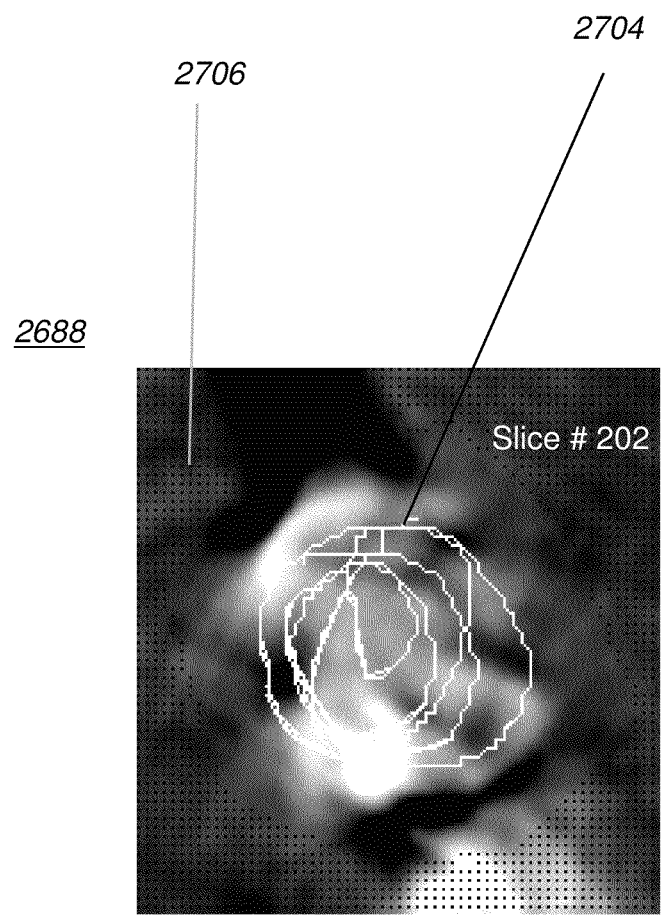
Figure 27E:
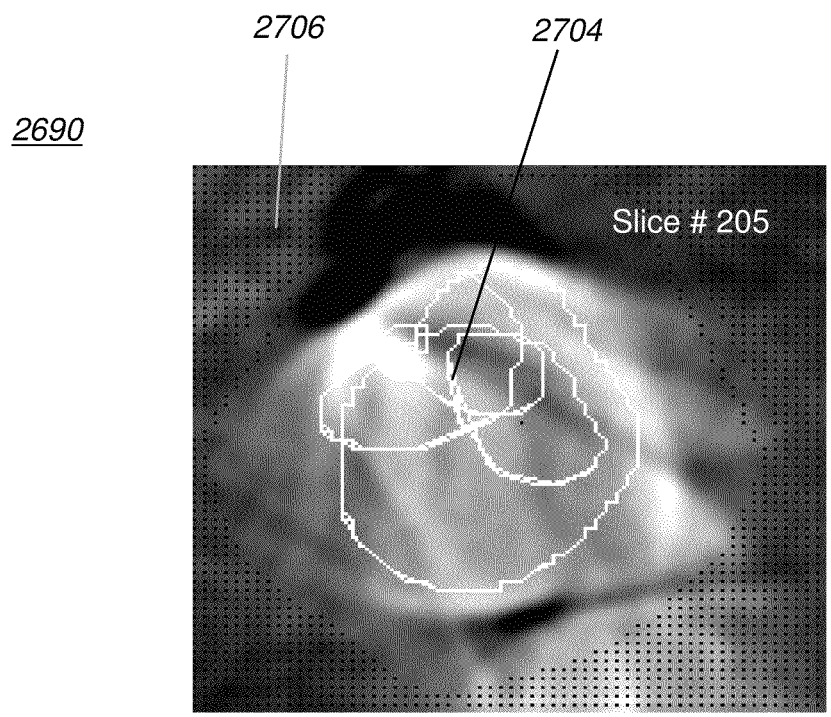

FIG. 26B shows, in thumbnail image form, a set 2680 of image slices. Representative slices 2682, 2684, 2686, 2688, and 2690, ordered from the bottom of the stack of set 2680 to the top in the arrangement shown, are members of set 2680 that are marked by the viewer in a markup step 2620 in this example. FIGS. 27A, 27B, 27C, 27D, and 27E then show marked-up slices 2682, 2684, 2686, 2688, and 2690, respectively, at a larger scale. In markup step 2620, selected members of set 2680 of image slices are marked up by the viewer with a foreground identifying pattern 2704, similar to the patterning described previously with respect to FIG. 14. While a convex hull may be formed as a result of the pattern markup, as described previously, embodiments of the present invention further define a background field array 2706, represented as a pattern of pixels in the 2-D slices of FIGS. 27A-27E. From foreground identifying pattern 2704, a seed point generation step 2630 generates foreground seeds from foreground identifying pattern 2704 and background seeds from background field array 2706.

Any number of image slices can be marked-up to provide suggestions/hints for segmentation in markup step 2620 (FIG. 26A), such as image slices that are representative of different portions of a tooth as shown in FIG. 26B. It can be appreciated that segmentation processing can be improved with a higher number of marked-up image slices.

As illustrated in FIGS. 27A-27E, background field array 2706, represented as a dot pattern, is generated as a representative set of points identifying image data elements (pixels for 2D, voxels for 3D) that are spaced apart from foreground identifying pattern 2704 by a predetermined distance and that cover and identify an area that contains only background content, not image data elements from the tooth or other object of interest. Area coverage that is provided by background field array 2706 helps to prevent segmentation processing from inadvertently associating image data elements (pixels or voxels) in the background content with the object of interest. Using this set of points, any structure that encounters background field array 2706 in segmentation processing can automatically be removed from consideration. Elements of the background field array are also used as background seeds in the automatic segmentation process, such as in the GrowCut algorithm mentioned previously. The spacing factors used for providing separation distance between background field array 2706 and the identified foreground can be empirically determined and can be variable. These distances may be adjusted to suit the requirements of a particular segmentation algorithm or the preferences of one or more viewers. According to an embodiment of the present invention, for example, background field array 2706 consists of points that are at least a given default or operator-adjusted distance from the center of the detected tooth or other object, as indicated by identifying pattern 2704. Background field array 2706 extends all along the periphery of the image in the embodiment that is shown.

According to an embodiment of the present invention, background field array 2706 may display immediately following entry of foreground identifying pattern 2704. Background field array 2706 from pattern marking in a particular slice propagates to adjacent slices over a limited range of slices, such as to the next few slices to each side of a marked slice. According to an alternate embodiment of the present invention, this propagation continues in a weighted manner, so that markup of a given slice influences adjacent slices, but the influence of markup of a given slice is progressively reduced with increased distance from the given slice. In this embodiment of the present invention, a "weighting" is assigned to voxels in other slices, based on the nearest markup information that is available.

Figure 28:
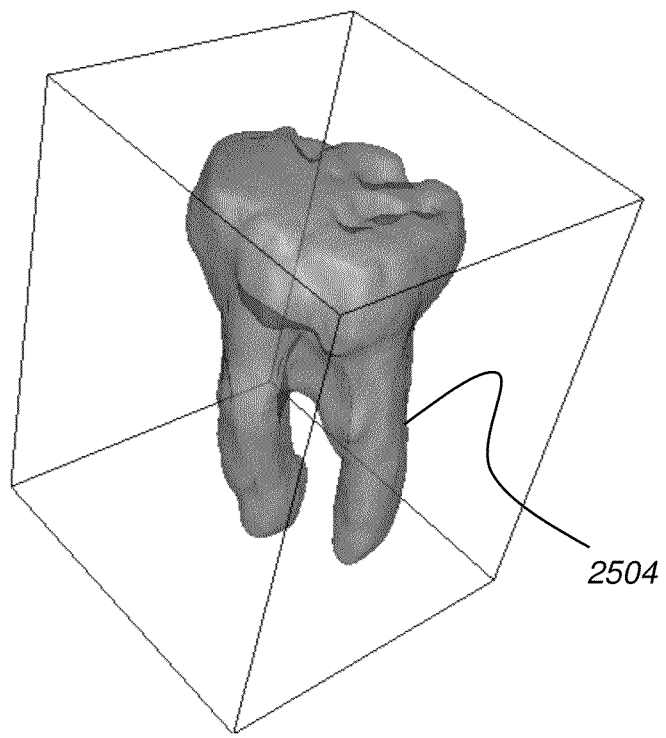
FIG. 28 is a perspective view that shows processing results for a segmented object of interest, without the false positives shown in the example of FIG. 25.

Referring to FIG. 26A, a combining step 2640 combines the identified background content with the volume image data prior to a segmentation step 2650 in which segmentation and display of results are provided. Segmentation algorithms that use the generated background field information can show marked improvement over techniques that simply use seed points generated along or outside a single line. The use of an array of points to define seed points for background content can help to reduce the likelihood of false positives. FIG. 28 shows segmented object of interest 2504 as displayed in volume image form, without the false positives shown in the example of FIG. 25.

Embodiments of the present invention provide a practical tooth segmentation system that takes advantage of synergistic integration of human operator skills, such as creativity, use of heuristics, flexibility, and judgment, with computational power, speed, capability for exhaustive and accurate processing, reporting, and data access, storage capabilities, and display flexibility. Using the method of the present invention, the operator can modify the segmentation process after viewing initial results, by editing the position of, adding, or removing boundary points, for example.

Consistent with an embodiment of the present invention, a computer executes a program with stored instructions that perform on image data accessed from an electronic memory, to provide panoramic presentation and tooth segmentation in accordance with the method described. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk (such as a hard drive) or magnetic tape or other portable type of magnetic disk; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It is noted that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to presently preferred embodiments, but it will be understood that variations and modifications can be effected that are within the scope of the invention. For example, the operator could enter equivalent bounding box information and seed information in any of a number of ways, including pointing to a particular tooth or other object using a touch screen or making a text entry on a keyboard, for example. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for segmenting a feature of interest from a volume image of a subject, comprising:
acquiring image data elements from the volume image;
displaying at least one view of the volume image;
identifying one or more boundary points along a boundary of the feature of interest according to one or more geometric primitives defined by a user with reference to the displayed at least one view;
forming a foreground seed curve defined according to the one or more identified boundary points;
forming a background field array disposed outside of the foreground seed curve by a predetermined distance;
applying segmentation to the volume image according to foreground values obtained according to image data elements that are spatially bounded on or within the foreground seed curve and according to background field array values to create a segmented feature of interest; and
displaying the segmented feature of interest.

2. The method of claim 1 wherein the geometric primitives defined by the user comprise a curve tracing a boundary.

3. The method of claim 1 wherein forming the foreground seed curve comprises generating an outline or a first convex hull containing the defined geometric primitives.

4. The method of claim 1 wherein the feature of interest is a tooth.

5. The method of claim 1 wherein the volume image is a computerized tomography image.

6. The method of claim 1 further comprising providing a selection of the one or more geometric primitives.

7. The method of claim 1 further comprising displaying the background field array.

8. A method for segmenting a feature of interest from a volume image of a subject, the method executed at least in part on a computer, comprising:
acquiring image data elements from the volume image;
identifying a sub-volume of the volume image that includes at least the feature of interest;
displaying at least one view of the sub-volume;
identifying one or more boundary points along a boundary of the feature of interest according to one or more geometric primitives defined by a user with reference to the displayed at least one view;

forming a foreground seed curve encompassing the one or more identified boundary points;

forming a background field array disposed outside of and spaced from the foreground seed curve by a predetermined distance;

applying segmentation to the volume image according to foreground values obtained according to image data elements that are spatially bounded on or within the foreground seed curve and according to the background field array values to create a segmented feature of interest; and displaying the segmented feature of interest.

9. The method of claim 8 wherein the feature of interest is a tooth.

10. The method of claim 8 wherein the volume image is a computerized tomography image.

* * * * *